US009686070B2

(12) United States Patent
Bowers et al.

(10) Patent No.: US 9,686,070 B2
(45) Date of Patent: Jun. 20, 2017

(54) DYNAMIC POLARIZATION MODULATION AND CONTROL

(71) Applicant: California Institute of Technology, Pasadena, CA (US)

(72) Inventors: Steven Bowers, Duarte, CA (US); Kaushik Dasgupta, Pasadena, CA (US); Amirreza Safaripour Tabbalvandani, Pasadena, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 160 days.

(21) Appl. No.: 13/770,935

(22) Filed: Feb. 19, 2013

(65) Prior Publication Data

US 2013/0279631 A1  Oct. 24, 2013

Related U.S. Application Data

(60) Provisional application No. 61/600,493, filed on Feb. 17, 2012, provisional application No. 61/705,996, filed on Sep. 26, 2012.

(51) Int. Cl.
*H04L 5/04* (2006.01)
*H04L 27/04* (2006.01)
(Continued)

(52) U.S. Cl.
CPC ............. *H04L 5/04* (2013.01); *H01Q 9/0407* (2013.01); *H01Q 21/245* (2013.01); *H04L 27/04* (2013.01); *H04L 27/20* (2013.01)

(58) Field of Classification Search
CPC ..... H04J 14/06; H04B 10/532; H04N 9/3167; G02B 27/283; G02B 27/26; H04L 27/04
See application file for complete search history.

(56) References Cited

U.S. PATENT DOCUMENTS 5,014,070 A   5/1991  Stock et al.
5,164,985 A   11/1992  Nysen et al.
(Continued)

FOREIGN PATENT DOCUMENTS

DE    10200601003 A1   6/2007
KR    10-2001-0096244 A   11/2001
(Continued)

OTHER PUBLICATIONS

U.S. Appl. No. 13/654,420, Unpublished, filed Oct. 18, 2012, California Insitute of Technology.
(Continued)

*Primary Examiner* — Curtis Odom
(74) *Attorney, Agent, or Firm* — Alston & Bird LLP

(57) ABSTRACT

A method for sending a data from an electromagnetic radiator by polarization modulation of an electromagnetic wave includes radiating from the radiator first and second electromagnetic waves including first and second polarizations respectively, the first polarization being different than the second polarization. The first and second electromagnetic waves form a third electromagnetic wave having a third polarization different from the first or second polarization. The method includes modulating the third polarization responsive to the data by modulating one or more parts of the third electromagnetic wave. The data is sent in the third polarization. A system for sending a data includes an oscillator adapted to generate an oscillating signal, and a phase shifter coupled to the oscillator and adapted to generate a first phase-shifted oscillating signal having a first phase. The phase shifter is adapted to vary the phase difference across a predefined range in response to the data.

16 Claims, 15 Drawing Sheets

(51) Int. Cl.
| | |
|---|---|
| H01Q 9/04 | (2006.01) |
| H01Q 21/24 | (2006.01) |
| H04L 27/20 | (2006.01) |

(56) References Cited

U.S. PATENT DOCUMENTS

| | | | |
|---|---|---|---|
| 5,886,671 | A | 3/1999 | Riemer et al. |
| 5,999,128 | A | 12/1999 | Stephens et al. |
| 6,140,972 | A | 10/2000 | Johnston et al. |
| 6,313,792 | B1 | 11/2001 | Merlet et al. |
| 6,469,822 | B1 | 10/2002 | Zhu |
| 6,927,745 | B2 | 8/2005 | Brown et al. |
| 7,208,940 | B2 | 4/2007 | Withanawasm et al. |
| 7,557,758 | B2 | 7/2009 | Rofougaran |
| 7,609,971 | B1 | 10/2009 | Zhou |
| 7,894,777 | B1 | 2/2011 | Rofougaran |
| 8,319,549 | B2 | 11/2012 | Sengupta et al. |
| 8,432,326 | B2 | 4/2013 | Rofougaran et al. |
| 2001/0003442 | A1 | 6/2001 | Smith |
| 2003/0035610 | A1 | 2/2003 | Keys et al. |
| 2003/0080899 | A1 | 5/2003 | Lee et al. |
| 2003/0184479 | A1 | 10/2003 | Collins |
| 2003/0202801 | A1 | 10/2003 | Izadpanah |
| 2004/0184556 | A1 | 9/2004 | Kubo et al. |
| 2005/0242993 | A1 | 11/2005 | Hein |
| 2007/0047966 | A1 | 3/2007 | Hironishi et al. |
| 2007/0176836 | A1 | 8/2007 | Abramov et al. |
| 2007/0184785 | A1 | 8/2007 | Yoshida et al. |
| 2008/0136720 | A1 | 6/2008 | Parsche et al. |
| 2008/0170862 | A1 | 7/2008 | Vassilieva et al. |
| 2009/0046794 | A1* | 2/2009 | Maruyama ............ H01Q 9/0435 375/260 |
| 2009/0128413 | A1 | 5/2009 | Crouch et al. |
| 2009/0140724 | A1 | 6/2009 | Kentsch |
| 2009/0168818 | A1* | 7/2009 | Gollier et al. .................. 372/27 |
| 2009/0179798 | A1 | 7/2009 | Chiaretti et al. |
| 2009/0220030 | A1 | 9/2009 | Uhl et al. |
| 2010/0019332 | A1 | 1/2010 | Taylor |
| 2010/0045565 | A1 | 2/2010 | Izadpanah |
| 2010/0156747 | A1 | 6/2010 | Montgomery |
| 2010/0231452 | A1 | 9/2010 | Babakhani et al. |
| 2010/0265146 | A1 | 10/2010 | Montgomery et al. |
| 2011/0057712 | A1 | 3/2011 | Bowers et al. |
| 2011/0068807 | A1 | 3/2011 | Kesil et al. |
| 2011/0103801 | A1 | 5/2011 | Breunig et al. |
| 2011/0115677 | A1 | 5/2011 | Rao et al. |
| 2011/0170869 | A1* | 7/2011 | Mandai et al. ................ 398/65 |
| 2013/0278473 | A1 | 10/2013 | Bowers et al. |
| 2014/0062805 | A1 | 3/2014 | Bowers et al. |
| 2014/0161464 | A1 | 6/2014 | Bowers et al. |

FOREIGN PATENT DOCUMENTS

| | | |
|---|---|---|
| RU | 2414051 C1 | 3/2011 |
| WO | 2010/015365 A2 | 2/2010 |
| WO | 2012/094051 A2 | 7/2012 |
| WO | 2013/112214 A2 | 8/2013 |
| WO | 2013/123090 A1 | 8/2013 |
| WO | 2013/123520 A1 | 8/2013 |
| WO | 2013/172896 A2 | 11/2013 |
| WO | 2014/018927 A1 | 1/2014 |

OTHER PUBLICATIONS

International Preliminary Report on Patentability for PCT Application No. PCT/US2013/026749 mailed Aug. 28, 2014, 10 pages.
International Search Report and Written Opinion for International Application No. PCT/US2013/025989 mailed on Jun. 3, 2013, 12 pages.
International Preliminary Report on Patentability for International Application No. PCT/US2012/060698 issued on Apr. 22, 2014, 6 pages.
Babakhani et al., "Transmitter Architectures based on Near-Field Direct Antenna Modulation," IEEE Journal of Solid-State Circuits, vol. 43, No. 12, Dec. 2008, pp. 2674-2692.
Laskin et al., "170-GHz Transceiver with On-Chip Antennas in SiGe Technology," IEEE Radio Frequency Integrated Circuits Symposium Digest, Jun. 2008, pp. 637-640.
Park et al., "A 0.38THz Fully Integrated Transceiver utilizing Quadrature Push-Push Circuitry," Symposium on VLSI Circuits Digest of Technical Papers, Jun. 2011, pp. 22-23.
Sengupta et al., "A 0.28THz 4x4 Power-Generation and Beam-Steering Array," International Solid State Circuits Conference Digest, Feb. 2012, pp. 9-11.
Sengupta et al., "Distributed Active Radiation for THz Signal Generation," International Solid State Circuits Conference Digest, Feb. 2011, pp. 288-289.
Sengupta et al., "Sub-THz Beam-Forming using Near-Field Coupling of Distributed Active Radiator Arrays," Radio Frequency Integrated Circuits Symposium, Jun. 2011, 4 pages.
Tang et al., "A 144GHz 0.76cm-Resolution Sub-Carrier SAR Phase Radar for 3D Imaging in 65nm CMOS," International Solid State Circuits Conference Digest, Feb. 2012, pp. 264-266.
International Search Report for International Application No. PCT/US2012/060698 mailed on Jul. 18, 2013, 2 pages.
International Search Report and Written Opinion for International Application No. PCT/US2013/052396 mailed on Nov. 21, 2013, 12 pages.
International Search Report and Written Opinion for International Application No. PCT/US2013/026749 mailed on Dec. 10, 2013, 11 pages.
International Preliminary Report on Patentability for International Application No. PCT/US2013/052396 mailed Feb. 5, 2015, 9 pages.
Non-Final Office Action for U.S. Appl. No. 13/654,420 mailed Jan. 21, 2015, 22 pages.
Non-Final Office Action for U.S. Appl. No. 13/952,493 mailed Mar. 2, 2015, 29 pages.
Non-Final Office Action for U.S. Appl. No. 13/766,667 mailed Apr. 16, 2015, 7 pages.
U.S. Appl. No. 13/654,420, Notice of Allowance mailed Aug. 19, 2015.
U.S. Appl. No. 13/654,420, Response to Non-final Office Action filed Jul. 21, 2015.
U.S. Appl. No. 13/766,667, Final Office Action filed Dec. 17, 2015.
U.S. Appl. No. 13/766,667, Response to Final Office Action filed Jun. 14, 2016.
U.S. Appl. No. 13/766,667, Response to Non-final Office Action filed Oct. 8, 2015.
U.S. Appl. No. 13/952,493, Final Office Action mailed Oct. 23, 2015.
U.S. Appl. No. 13/952,493, Non-final Office Action mailed May 11, 2016.
U.S. Appl. No. 13/952,493, Response to Final Office Action filed Apr. 22, 2016.
U.S. Appl. No. 13/952,493, Response to Non-final Office Action filed Sep. 1, 2015.
U.S. Appl. No. 14/791,217, Non-Final Office Action mailed Aug. 27, 2015.
U.S. Appl. No. 14/791,217, Notice of Allowance mailed Mar. 15, 2016.
U.S. Appl. No. 14/791,217, Notice of Allowance mailed Jul. 6, 2016.
U.S. Appl. No. 14/791,217, Response to Non-Final Office Action mailed Feb. 25, 2016.

* cited by examiner

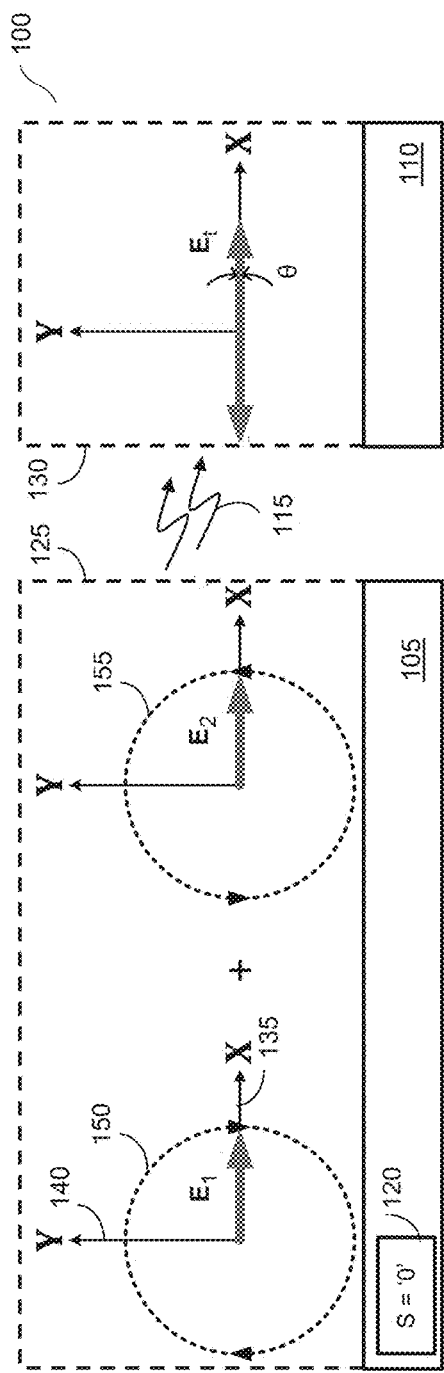
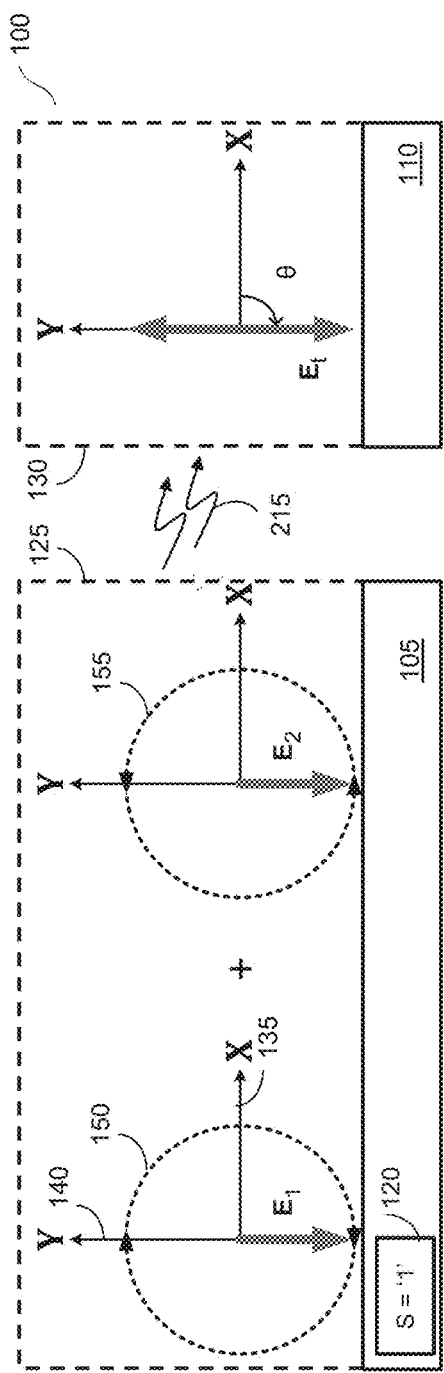
FIG. 1
FIG. 2

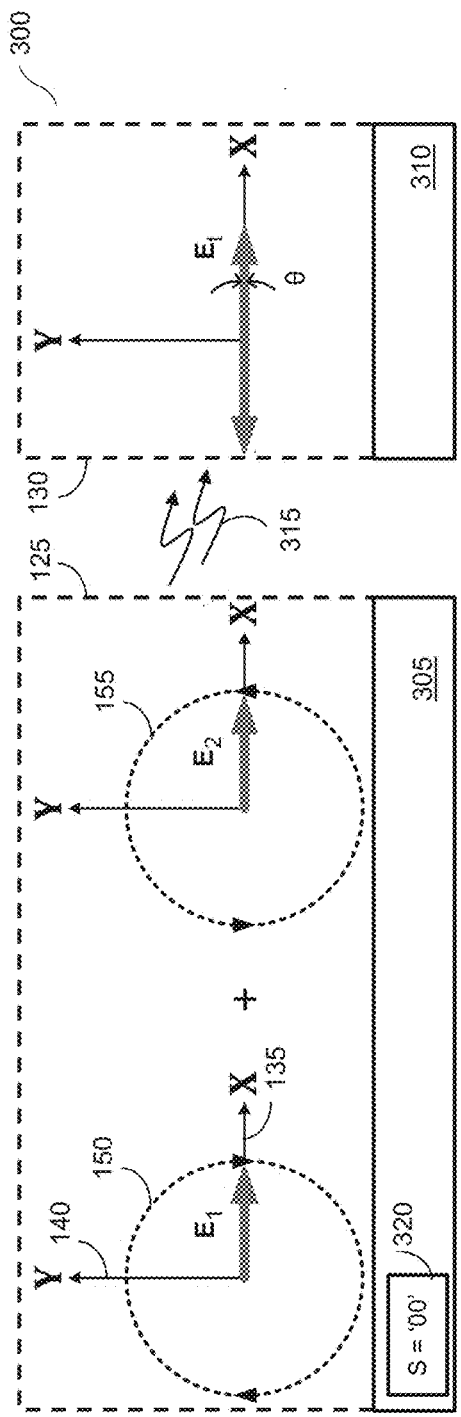
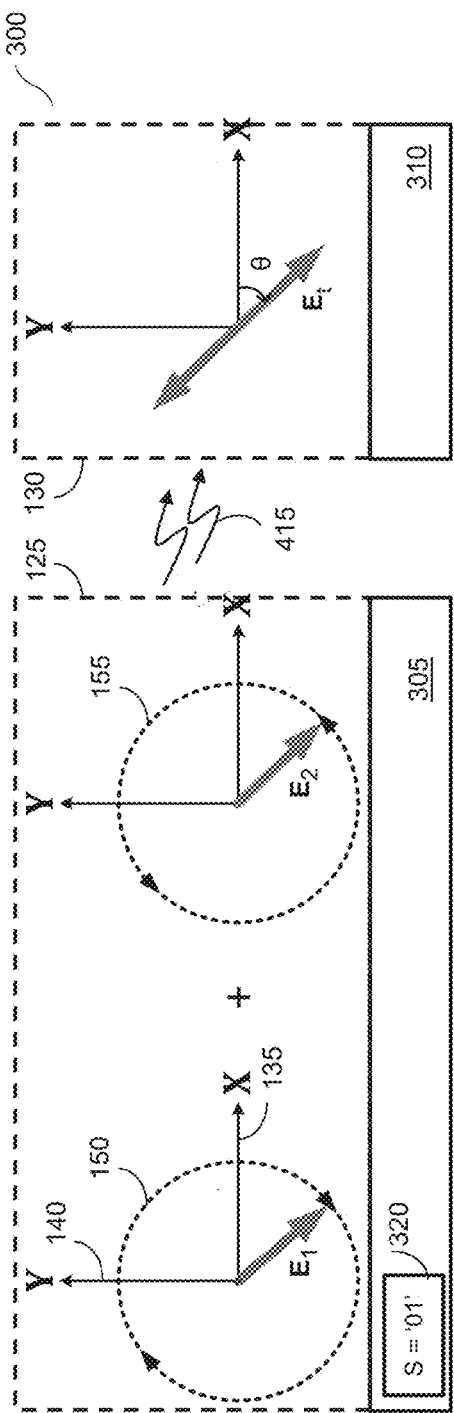

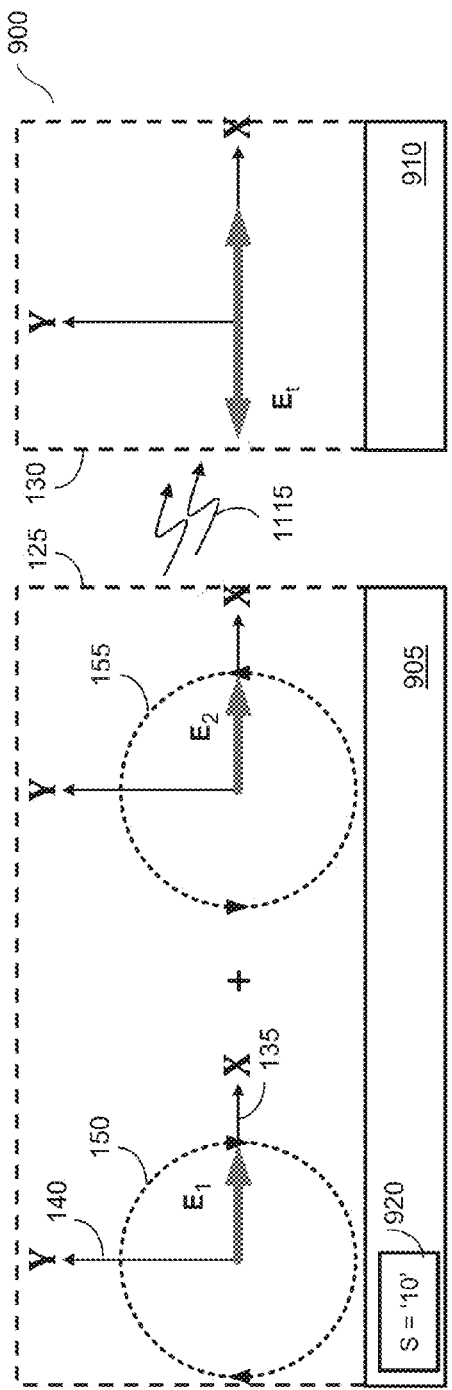
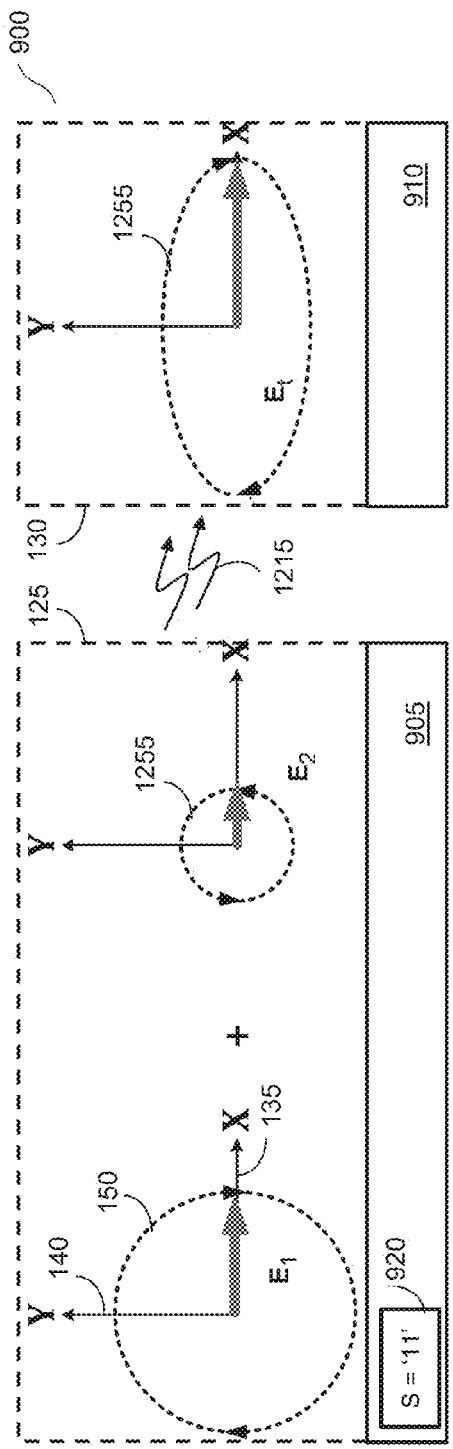

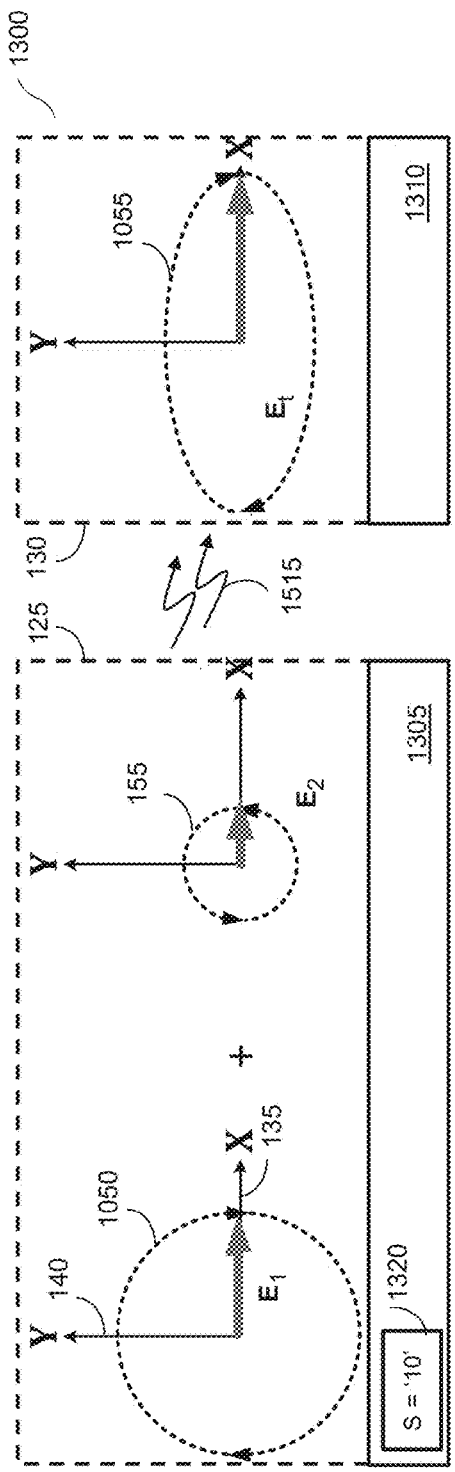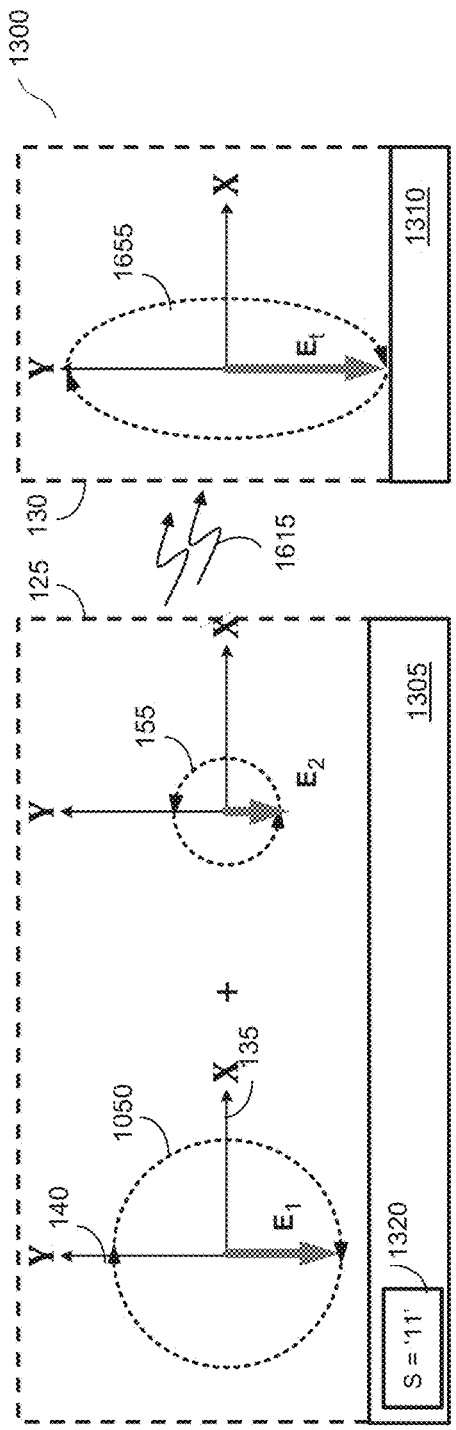
FIG. 15
FIG. 16

DYNAMIC POLARIZATION MODULATION AND CONTROL

CROSS-REFERENCE TO RELATED APPLICATIONS

The present application claims the benefit under 35 §U.S.C 119(e) of U.S. Provisional Patent Application No. 61/600,493, filed Feb. 17, 2012, entitled "DYNAMIC POLARIZATION MODULATION AND CONTROL" and Provisional Patent Application No. 61/705,996, filed Sep. 26, 2012, entitled "POLARIZATION AGILE TRANSMITTER & RECEIVER ARCHITECTURE", the content of which are incorporated herein by reference in their entirety. The present application is related to U.S. patent application Ser. No. 13/654,420, filed Oct. 18, 2012, entitled "EFFICIENT ACTIVE MULTI-DRIVE RADIATOR", the content of which is incorporated herein by reference in its entirety.

BACKGROUND

The present invention relates generally to sending data by electromagnetic (EM) waves and in particular, to sending data through polarization modulation of electromagnetic waves.

The rise in use of the EM-spectrum has created a great demand to use that limited spectrum more efficiently, and with enhanced security. Advances in data processing and information theory help, but there is room for improvement on the hardware side. Amplitude modulation (AM) uses a low frequency data signal, such as a human voice, to modulate the amplitude a much higher constant frequency carrier signal to form the radiated EM transmission wave. Alternatively, frequency modulation (FM) uses the low frequency data to modulate the frequency of a much higher frequency carrier signal of constant amplitude to form the radiated EM transmission wave.

While most modern radios make use of both in phase (I) and quadrature (Q) signals, i.e. two independent data streams, they do not take advantage of the additional throughput offered by using multiple polarizations. This is because often the orientation of the receive antenna is not known and thus signals are sent with a single polarization (either circular or linear).

Polarization is a property of some radiated EM waves. Polarization examples include linear or plane, elliptical, and circular. Polarization of transmitted signals is used to enhance transmission characteristics of radio waves, i.e. by polarizing a radiated EM wave to match the orientation of a receiving antenna (hereinafter alternatively referred to as receive antenna or receiver). Because the orientation of the receiver is unknown, sending data from a sending antenna (hereinafter alternatively referred to as radiating antenna or radiator or transmitter) in a circular polarization either clockwise (CW) or counterclockwise (CCW) is more effective than linear polarizations because the receiver can rotate in the x-y plane without effect on the signals and the degradation due to the receiver being off axis to the z-axis is similar to that of linear polarizations.

Polarization multiplexing is used in the optical regime where two different light beams, one with CW circular polarization and another with CCW circular polarization are combined and sent over an optical fiber transmission line at the same time to double the available signal bandwidth. This is possible because the orientation of the optical receiver is known in comparison to the fiber orientation so that the two differently polarized optical signals can be separated and each treated individually as separate signal transmission paths. In most cases antennas are single-port antennas capable of transmitting or receiving only a specific type of polarization.

BRIEF SUMMARY

According to one embodiment of the present invention, a method for sending a data from an electromagnetic radiator by polarization modulation of an electromagnetic wave includes radiating from the radiator a first electromagnetic wave including a first polarization, and radiating from the radiator a second electromagnetic wave including a second polarization different than the first polarization. The first and second electromagnetic waves form a third electromagnetic wave having a third polarization different from the first or second polarization. The method further includes modulating the third polarization responsive to the data by modulating one or more parts of the third electromagnetic wave. The data is sent in the third polarization.

According to one embodiment, the first electromagnetic wave includes a first phase and the second electromagnetic wave includes a second phase. The one or more parts are selected from the group consisting of the first phase, and the second phase. According to one embodiment, the first electromagnetic wave includes a first amplitude and the second electromagnetic wave includes a second amplitude. The one or more parts are selected from the group consisting of the first amplitude, and the second amplitude.

According to one embodiment, the first electromagnetic wave includes a first phase and a first amplitude and the second electromagnetic wave includes a second phase and a second amplitude. The one or more parts are selected from the group consisting of the first phase, the second phase, the first amplitude, and the second amplitude. According to one embodiment, the first electromagnetic wave includes a first phase and a first amplitude and the second electromagnetic wave includes a second phase and a second amplitude. Modulating one or more parts includes simultaneously modulating the first phase, the second phase, the first amplitude, and the second amplitude.

According to one embodiment, the method further includes setting the first polarization to a clock-wise circular polarization, and setting the second polarization to a counter-clock-wise circular polarization. According to one embodiment, the method further includes setting the first polarization to a first linear polarization having a first angle, and setting the second polarization to a second linear polarization having a second angle substantially perpendicular to the first angle. According to one embodiment, the third polarization is a linear polarization. According to one embodiment, the third polarization is an elliptical polarization.

According to one embodiment, the method further includes setting a first amplitude of the first electromagnetic wave equal to a second amplitude of the second electromagnetic wave, setting the first polarization to a clock-wise circular polarization, and setting the second polarization to a counter-clock-wise circular polarization. The one or more parts includes a first phase of the first electromagnetic wave and a second phase of the second electromagnetic wave, the third polarization being a linear polarization having an angle. The method further includes modulating the angle responsive to a difference between the first and second phase, the difference being responsive to the data. According to one embodiment, the angle corresponds to a symbol representing the data. According to one embodiment, the symbol sends a single bit of information at a time. According to one embodiment, the symbol sends a multitude of bits of data simultaneously in time.

According to one embodiment, the method further includes setting a first phase of the first electromagnetic wave equal to a second phase of the second electromagnetic wave, setting the first polarization to a clock-wise circular polarization, and setting the second polarization to a counter-clock-wise circular polarization. The one or more parts includes a first amplitude of the first electromagnetic wave and a second amplitude of the second electromagnetic wave, the third polarization being an elliptical polarization having a polarization ratio. The method further includes modulating the polarization ratio responsive to the data.

According to one embodiment, the polarization ratio is a quotient of the first amplitude divided by the second amplitude. According to one embodiment, the polarization ratio corresponds to a symbol representing the data.

According to one embodiment of the present invention, a method for receiving a data from an electromagnetic receiver by polarization demodulation of an electromagnetic wave, the method includes receiving from an antenna a first signal having a first polarization and a second signal having a second polarization, the first and second signals being associated with the electromagnetic wave, the electromagnetic wave including a third polarization. The method further includes determining an amplitude of the first signal, determining an amplitude of the second signal, and determining an angle of the third polarization to receive the data.

According to one embodiment, the first and second polarizations are linear. According to one embodiment, the first and second polarizations are substantially orthogonal. According to one embodiment, determining the angle includes calculating a quotient of the amplitude of the second signal divided by the amplitude of the first signal.

According to one embodiment of the present invention, a system for sending a data from a radiator by polarization modulation of an electromagnetic wave includes an oscillator adapted to generate an oscillating signal, and a phase shifter coupled to the oscillator and adapted to generate a first phase-shifted oscillating signal having a first phase. A phase difference exists between the first phase and the oscillating signal. The phase shifter is further adapted to vary the phase difference across a predefined range in response to the data.

According to one embodiment, the phase shifter is further adapted to generate a second phase-shifted oscillating signal having a second phase. A phase difference between the first phase and the second phase defines the phase difference.

According to one embodiment, the system further includes a radiator adapted to accept the first phase-shifted oscillating signal and the oscillating signal and respectively radiate a first electromagnetic wave having a first circular polarization and a second electromagnetic wave having a second circular polarization different than the first circular polarization, the first electromagnetic wave and the second electromagnetic wave adapted to form a third electromagnetic wave having linear polarization and having an angle, the angle being responsive to the data.

According to one embodiment, the radiator includes an antenna positioned substantially in a plane defined by a first direction and a second direction orthogonal to the first direction, the antenna being symmetric about a center in the first direction and in the second direction, the antenna including a first port positioned at an edge of the antenna in the first direction and a second port positioned at an edge of the antenna in the second direction. According to one embodiment, the radiator includes a first antenna adapted to radiate the first electromagnetic wave and second antenna adapted to radiate the second electromagnetic wave.

According to one embodiment of the present invention, a system for sending a data from a radiator by polarization modulation of an electromagnetic wave includes a first circuit adapted to generate a first signal and a second signal, an oscillator adapted to generate an oscillating signal, a phase shifter coupled to the oscillator and adapted to generate a first phase-shifted oscillating signal and a second phase-shifted oscillating signal having a phase difference therebetween. The phase shifter is adapted to vary the phase difference across a predefined range in response to the data. The system further includes a first frequency converter is coupled to the phase shifter and the first circuit, the first frequency converter adapted to convert a frequency of the first signal in response to the first phase-shifted oscillating signal to generate a first frequency converted signal, and a second frequency converter coupled to the phase shifter and the first circuit, the second frequency converter adapted to convert a frequency of the second signal in response to the second phase-shifted oscillating signal to generate a second frequency converted signal.

According to one embodiment, the system further includes a radiator adapted to accept the first and second frequency converted signals and respectively radiate a first electromagnetic wave having a first polarization and a second electromagnetic wave having a second polarization different than the first polarization, the first electromagnetic wave and the second electromagnetic wave adapted to form a third electromagnetic wave having a third polarization, the third polarization modulated by one or more parts of the combined electromagnetic wave responsive to the data.

According to one embodiment, the first polarization is a clock-wise circular polarization and the second polarization is a counter-clock-wise circular polarization. According to one embodiment, the first polarization is a first linear polarization having a first angle and the second polarization is a second linear polarization having a second angle substantially perpendicular to the first angle.

According to one embodiment, a first phase of the first electromagnetic wave is equal to a second phase of the second electromagnetic wave, the first polarization is a clock-wise circular polarization, the second polarization is a counter-clock-wise circular polarization. The one or more parts includes a first amplitude of the first electromagnetic wave and a second amplitude of the second electromagnetic wave, the third polarization being an elliptical polarization having a polarization ratio responsive to the data.

According to one embodiment of the present invention, a system for receiving a data from an electromagnetic wave by polarization demodulation includes an antenna adapted to pick up a first signal having a first polarization and a second signal having a second polarization, the first and second signals being associated with the electromagnetic wave. The electromagnetic wave including a third polarization, a first circuit adapted to determine an amplitude of the first signal, a second circuit adapted to determine an amplitude of the second signal, and a third circuit adapted to determine an angle of the third polarization responsive to the data.

According to one embodiment, the third circuit is further adapted to calculate a quotient of the amplitude of the second signal divided by the amplitude of the first signal. The quotient is responsive to the angle.

A better understanding of the nature and advantages of the embodiments of the present invention may be gained with reference to the following detailed description and the accompanying drawings.

BRIEF DESCRIPTION OF THE DRAWINGS

FIG. 1 is a simplified block diagram of a system for sending data from a transmitter to a receiver by polarization modulation of an electromagnetic wave with a symbol encoded to a data bit '0', in accordance with an embodiment of the present invention.

FIG. 2 is a simplified block diagram of the system for sending data shown in FIG. 1 with a symbol encoded to a data bit '1', in accordance with an embodiment of the present invention.

FIG. 3 is a simplified block diagram of a system for sending data from a transmitter to a receiver by polarization modulation of an electromagnetic wave with a symbol encoded to a data bit '00', in accordance with an embodiment of the present invention.

FIG. 4 is a simplified block diagram of the system for sending data shown in FIG. 3 with a symbol encoded to a data bit '01', in accordance with an embodiment of the present invention.

FIG. 11 is a simplified block diagram of the system for sending data shown in FIG. 9 with a symbol encoded to a data bit '10', in accordance with an embodiment of the present invention.

FIG. 12 is a simplified block diagram of the system for sending data shown in FIG. 9 with a symbol encoded to a data bit '11', in accordance with an embodiment of the present invention.

FIG. 15 is a simplified block diagram of the system for sending data shown in FIG. 13 with a symbol encoded to a data bit '10', in accordance with an embodiment of the present invention.

FIG. 16 is a simplified block diagram of the system for sending data shown in FIG. 13 with a symbol encoded to a data bit '11', in accordance with an embodiment of the present invention.

DETAILED DESCRIPTION

Figure 5:
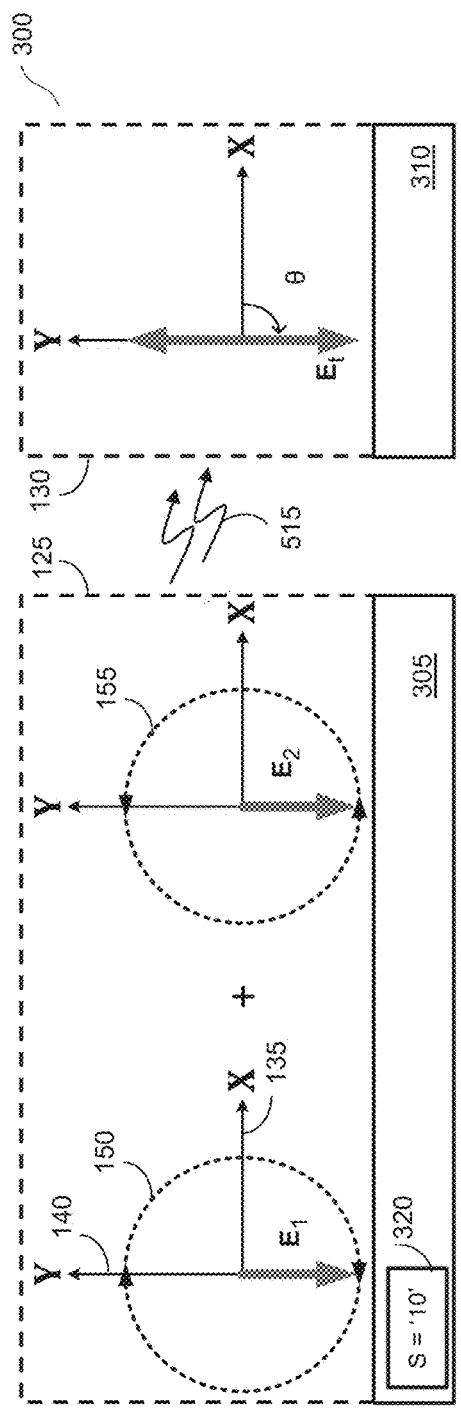
FIG. 5 is a simplified block diagram of the system for sending data shown in FIG. 3 with a symbol encoded to a data bit '10', in accordance with an embodiment of the present invention.

Regardless of the information being sent, there are four independent data streams that can be sent as long as the energy is being received in the far-field region of the antennas. The far-field region of the antennas is where the presence of the receive antenna does not interfere with the send antenna and where the Poynting vector is parallel to the line connecting the two antennas and pointing toward the receive antenna.

The four independent data streams result from the ability to send information "in phase" (I) and "in quadrature" (Q), i.e. 90° separation in phase when down converting the signal, simultaneously for any given polarization independently. There are also two independent polarizations that can each support signals in phase and quadrature. Defining a coordinate system with the z-axis parallel to the Poynting vector, the E-field and H-field planes will lie in the x-y plane. The two independent polarizations can be defined with linear polarizations that are 90° apart in the x-y plane, or with circular polarization in both the CW and CCW directions.

According to an embodiment of the present invention, a method and system is described whereby polarization modulation transmits or sends data through an EM wave. The term "polarization" is defined herein as the direction of the electric field vector of a radiated EM wave, such as a radio wave. This definition is not to be confused with the term "polarization" used in the completely different context of dielectric material properties, wherein the term polarization, i.e. "dielectric polarization", describes a process producing a relative displacement of bound electrical charges in a material by applying an electric field. The term "polarization" is also used in another different context where polarization is related to an electrical polarity difference of an electrical component, such as an electrical plug with "+" and "−" terminals or component polarization. Dielectric polarization and component polarization have nothing to do with polarization in the context of a radiated EM wave, which is described herein.

Sending data by modulating the polarization provides a way to utilize all four theoretically possible independent data streams simultaneously without the drawback of one fixed polarization at the receiver. Further, according to another embodiment, sending data through polarization modulation adds an extra layer of security to the data transmission because not only is the proper antenna and radio required on the receive side, but the polarization in undesired directions may be different than in the desired direction. Because the symbol is the polarization, the data sent to the intended receiver in the desired direction is different than the data received in undesired directions. Polarization modulation is in stark contrast with traditional radio and antenna modulation schemes where the signal is attenuated in the undesired directions but can still be recovered with a sensitive enough receiver. In other words, with polarization modulation the signal itself will change based on the location of the receiver, effectively attenuating and scrambling the signal in undesirable directions. Using a phased array and proper design of the radiating structure, the transmitted EM beam can be steered to send most of the power and the correct signal to different receivers at different times.

FIG. 1 is a simplified block diagram of a communication system 100 for sending data from a transmitter 105 to a receiver 110 by polarization modulation of an EM wave 115 with a symbol S 120 encoded to a data bit '0', in accordance with an embodiment of the present invention. Transmitter 105 may simultaneously send out or radiate a first EM wave including a first polarization and a second EM wave including a second polarization different than the first polarization at a near field position 125 of transmitter 105. The first and second EM waves combine through superposition to form a third EM wave at a far field position 130 near receiver 110. The third EM wave may have a different polarization than either the first or second EM waves. By setting parameters or parts of the first and second EM waves appropriately, the polarization of the third EM wave in the far field is modulated responsive to data being sent or transmitted.

According to an embodiment of the invention, two circularly polarized EM waves are radiated by a transmitter with the same amplitude but different circular polarizations, one with CW and the other with CCW circular polarizations. The resulting effect in the far field is a linearly polarized EM wave at a field angle, which is determined by the relative phase difference between the two EM waves as described below. By modulating the phases of the two circularly polarized fields, the angle of the linear polarization that is produced in the far field is modulated. Further, data may be encoded with the angle position being a symbol and the information transmitted by polarization modulation of the EM waves.

The EM wave and its polarization are characterized by describing its electrical field vector represented in a plane defined by a X-axis 135 and a Y-axis 140 at time t=0. The Z-axis in a direction out of the page represents the direction of the Poynting vector of the EM wave and corresponds to the direction of propagation.

In one embodiment the first EM wave is represented at near field 125 by its electrical field vector $E_1$ positioned on X-axis 135 at t=0. This first EM wave includes CW polarization, which is represented by the small dashed directional circle 150, with small arrows indicating the position of $E_1$ will change at t>0 by rotating the point of $E_1$ in a CW direction relative to the previous time, while the base of $E_1$ remains fixed at the origin of X-axis 135 and a Y-axis 140. The length of vector $E_1$ corresponds to an amplitude A of the first EM wave. The first EM wave may be represented mathematically in terms of unit vectors $u_x$ and $u_y$ by the equation:

$$E_1 = A(\cos(\omega t + \phi_1)u_x + \cos(\omega t + \phi_1 + \pi/2)u_y) \quad \text{(Eq. 1)},$$

where $\omega$ represents the angular frequency, and the phase $\phi_1 = 0°$ since $E_1$ is positioned or aligned on X-axis 135 at t=0.

As a matter of notation, phase is used to represent the phase of the signal in time and angle to represent the physical angle of the field polarization in space. It is understood, the first EM wave could be similarly represented by sin functions. However, sin functions reference the electric field vector angle relative to the Y-axis. The cos function, used herein, provides a simpler explanation by instead referencing the vector angle to the X-axis, however mathematical derivations using sin functions are analogous.

The second EM wave in near field 125 is represented by its electrical field vector $E_2$ positioned the X-axis at t=0. However, the second EM wave includes CCW polarization, which is represented by the small dashed circle 155, with small arrows indicating the position of $E_2$ will change at t>0 by rotating the point of $E_2$ in a CCW direction relative to the previous time, while the base of $E_2$ remains fixed at the origin of the X-axis and a the Y-axis. The second EM wave, having the same amplitude A as the first EM wave, may be similarly represented mathematically in terms of unit vectors $u_x$ and $u_y$ by the equation:

$$E_2 = A(\cos(\omega t + \phi_2)u_x + \cos(\omega t + \phi_2 - \pi/2)u_y) \quad \text{(Eq. 2)},$$

where $\omega$ represents the angular frequency, and the phase $\phi_2 = 0°$ since $E_2$ is positioned or aligned on X-axis 135 at t=0. The polarization direction is represented in equations 1 and 2 by the + or − sign before the $\pi/2$ corresponding to CW and CCW respectively.

Combining the first and second EM waves in far field 130 gives the third EM wave $E_t$ as follows:

$$E_t = E_1 + E_2 \quad \text{(Eq. 3)}.$$

Substituting from equations 1 and 2 into equation 3 yields:

$$E_t = A(\cos(\omega t + \phi_1)u_x + \cos(\omega t + \phi_1 + \pi/2)u_y) + A(\cos(\omega t + \phi_2)u_x + \cos(\omega t + \phi_2 - \pi/2)u_y) \quad \text{(Eq. 4)}.$$

Define:

$$\Delta\phi = \phi_1 - \phi_2 \quad \text{(Eq. 5), and}$$

$$\Sigma\phi = \phi_1 + \phi_2 \quad \text{(Eq. 6)}.$$

Substitution of equations 5 and 6 into equation 4 yields:

$$E_t = 2A[\cos(\Delta\phi/2)\cos(\omega t + \Sigma\phi/2)u_x + \cos(\Delta\phi/2 + \pi/2)\cos(\omega t + \Sigma\phi/2)u_y] \quad \text{(Eq. 7)}.$$

Rewriting equation 7 by collecting the vector components yields:

$$E_t = 2A\{\cos(\omega t + \Sigma\phi/2)[\cos(\Delta\phi/2)u_x + \cos(\Delta\phi/2 + \pi/2)u_y]\} \quad \text{(Eq. 8)}.$$

Removing the π/2 term in equation 8 by replacing the cos function by a sin function yields:

$$E_t = 2A\{\cos(\omega t + \Sigma\phi/2)[\cos(\Delta\phi/2)u_x - \sin(\Delta\phi/2)u_y]\} \quad \text{(Eq. 9)}.$$

Equation 9 describes the resulting superposition of the first and second EM waves at far field 130. It should be recognized that equation 9 includes the time varying part of the field at the left part of the equation and the vector directional components at the right. Thus, the vector directional components of $E_t$ in the x and y dimensions are always in phase regardless of $\phi_1$ or $\phi_2$ and describe a linearly polarized wave in far field. Equation 9 shows that the third field, $E_t$, is characterized by:

$$\text{mag}(E_t) = 2A \quad \text{(Eq. 10)},$$

$$\text{phase}(E_t) = \Sigma\phi/2 \quad \text{(Eq. 11), and}$$

$$\text{angle}(E_t) = -\Delta\phi/2 \quad \text{(Eq. 12)}.$$

It is observed that; i) the magnitude of the third EM wave is also independent of $\phi_1$ or $\phi_2$, and ii) the angle of polarization of the third EM wave is only dependent on the difference between the phases of the original first and second EM waves. Thus, by modulating that relative phase ($\Delta\phi$), the angle of the linear polarization in the far field will change. This adds an additional level of security, as most current receivers are not even able to detect information transmitted in this way, as they will only detect one polarization.

Using even and odd mode analysis, odd mode phase modulation ($\Delta\phi/2$) between the first and second EM waves may modulate the angle of the polarization of the third EM wave, while the even mode amplitude (A) and phase modulation ($\Sigma\phi/2$) will modulate the amplitude and phase of the received signal in a traditional sense at whatever polarization is defined by the odd mode. Thus, even mode modulation can be used either to send additional data, for instance as conventional I(t) and Q(t) quadrature carrier signals in the time varying component of the third EM wave, or even to obscure the data symbol sent through the polarization modulation. This is because the polarization modulation signal is sent through $\Delta\phi$, so changes to A and $\Sigma\phi$ will not affect the intended polarization modulation symbol, but will change the phase and amplitude received by a traditional single polarization receiver. In contrast, by sending additional data symbols through the amplitudes of $E_1$ and $E_2$, as well as through $\Sigma\phi$, all four theoretically independent data streams may be used simultaneously.

Referring again to FIG. 1, the communication symbol for communication system 100 is the polarization of the third EM wave. The symbol is encoded or modulated by setting one or more parts of the first and second EM waves by transmitter 105 to modulate the polarization received at receiver 110. The one or more parts of the first and second EM waves include the phase and amplitude of the first EM wave and the phase and amplitude of the second EM wave.

When the amplitude of the first and second EM waves are set equal, i.e. the length of $E_1$ equals the length of $E_2$ as shown, then the third EM wave ($E_t$) at far field 130 is linearly polarized as mathematically derived in the equations above. Linear polarization is represented by showing $E_t$ without any directional circle 150 or 155. Unlike the circular polarization for $E_1$ and $E_2$, $E_t$ oscillates in time in the plane perpendicular to the X-Y plane intersecting the coordinate origin at an angle θ with respect to the X-axis.

In this example symbol S 120 is the polarization angle θ of the third wave, $E_t$. For example, S may be chosen equal to a data bit '0' and may be encoded to mean angle θ=0° by setting $\phi_1 = \phi_2 = 0°$ in transmitter 105. Then, $E_t$ will oscillate as a linear or plane polarized wave either towards the + or −X axis directions in this case since the plane it oscillates in intersects the x-axis because angle θ=0°. Thus, $E_t$ is shown with its vector pointing towards the +X axis direction at t=0. The magnitude of $E_t$=2A. The symbol may be decoded or demodulated at receiver 110 by extracting the polarization angle as will be discussed in detail below.

FIG. 2 is a simplified block diagram of system 100 for sending data shown in FIG. 1 with symbol S 120 encoded to a data bit '1', in accordance with an embodiment of the present invention. FIG. 2 is marked with the same features as FIG. 1 except S may be chosen equal to a data bit '1' and may be encoded to mean polarization angle θ=−90° by setting $\phi_1 = +90°$ and $\phi_2 = -90°$ in transmitter 105. It is noted that now $E_2$ is shown pointing downwards towards the −Y axis direction because $\phi_2 = -90°$ is similar to going back in time from t=0 against the CCW direction by 90°.

Thus FIG. 1 and FIG. 2 show a system where S is encoded for one bit data transmission. However, because angle θ is determined from $\phi_1$ and $\phi_2$, which are analog parameters, angle θ may be continuously variable as desired. According to an embodiment, the polarization angle θ of the third EM wave may be varied in analog fashion to any desired angle across a predefined range. Thus, encoding more than two angles provides a way to encode and simultaneously transmit a multitude of bits simultaneously as described below.

FIG. 3 is a simplified block diagram of a system 300 for sending data from a transmitter 305 to a receiver 310 by polarization modulation of an electromagnetic wave 315 with a symbol S 320 encoded to a data bit '00', in accordance with an embodiment of the present invention. FIG. 3 is similar to the embodiment shown in FIG. 1 except in FIG. 3 symbol S is encoded with two bits '00' by setting $\phi_1 = +90°$ and $\phi_2 = -90°$ in transmitter 105, which results in polarization angle θ=0°. The symbol may be decoded or demodulated at receiver 310 by extracting the polarization.

FIG. 4 is a simplified block diagram of system 300 for sending data shown in FIG. 3 with symbol S 320 encoded to a data bit '01', in accordance with an embodiment of the present invention. FIG. 4 is similar to the embodiment shown in FIG. 3 except in FIG. 4 symbol S is encoded with '01' by setting $\phi_1 = +45°$ and $\phi_2 = -45°$ in transmitter 305 which results in polarization angle θ=−45°. Then, $E_t$ will oscillate as a linear or plane polarized wave in the plane perpendicular to the X-Y plane at angle θ=−45° relative to the X-axis.

FIG. 5 is a simplified block diagram of system 300 for sending data shown in FIG. 3 with symbol S 320 encoded to a data bit '10', in accordance with an embodiment of the present invention. FIG. 5 is similar to the embodiment shown in FIG. 3 except in FIG. 5 symbol S is encoded with '10' by setting $\phi_1 = +90°$ and $\phi_2 = -90°$ in transmitter 305 which results in polarization angle θ=−90°. Then, $E_t$ will oscillate as a linear or plane polarized wave in the plane perpendicular to the X-Y plane at angle θ=−90° relative to the X-axis, i.e. in the Y-axis direction.

Figure 6:
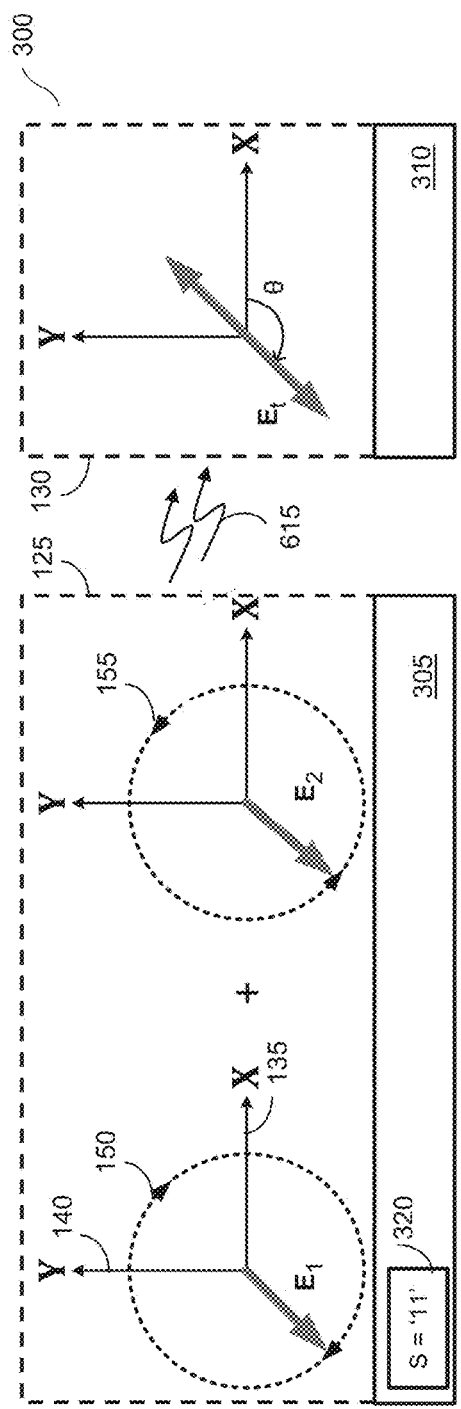
FIG. 6 is a simplified block diagram of the system for sending data shown in FIG. 3 with a symbol encoded to a data bit '11', in accordance with an embodiment of the present invention.

FIG. 6 is a simplified block diagram of system 300 for sending data shown in FIG. 3 with symbol S 320 encoded to a data bit '11', in accordance with an embodiment of the present invention. FIG. 6 is similar to the embodiment shown in FIG. 3 except in FIG. 5 symbol S is encoded with '11' by setting $\phi_1 = +135°$ and $\phi_2 = -135°$ in transmitter 305 which results in polarization angle θ=−135°. Then, $E_t$ will oscillate as a linear or plane polarized wave in the plane perpendicular to the X-Y plane at angle θ=−135° relative to the X-axis.

According to another embodiment, amplitude modulation of $E_1$ and $E_2$ may be used on the odd mode to modulate the polarization of $E_t$, which may no longer be linear polarized, but rather $E_t$ may be elliptically polarized, or if one amplitude is 0 and the other amplitude is non-zero, the result may be a circular polarization in the far field for $E_t$. This means that data may also be sent by modulating the odd mode amplitude and by detecting the polarization ratio (polRatio) of $E_t$, defined as the |E-field(CW)|/|E-field(CCW)|. From equations 1 and 2, A is now defined separately for each EM wave $E_1$ and $E_2$ as:

$$E_1 = A_1(\cos(\omega t + \phi_1)u_x + \cos(\omega t + \phi_1 + \pi/2)u_y) \quad \text{(Eq. 13), and}$$

$$E_2 = A_2(\cos(\omega t + \phi_2)u_x + \cos(\omega t + \phi_2 - \pi/2)u_y) \quad \text{(Eq. 14).}$$

$$\text{Thus, polRatio}(E_t) = A_1/A_2 \quad \text{(Eq. 15).}$$

A polarization ratio value near 1 is linearly polarized, while a value near 0 or very high indicates polarization closer to circular, i.e. with polarization ratio=0 or infinity indicating exactly circular polarization. For polarization ratio>1, the polarization of $E_t$ may be a CW elliptical polarization, while for polarization ratio<1, the polarization of $E_t$ may be a CCW elliptical polarization. The angle($E_t$) of equation 12 now represents the angle of the major axis of the ellipse (or angle of linear polarization when $A_1 = A_2$) and will still equal $-\Delta\phi/2$. Thus, as with independent data sent through CW or CCW circular polarizations, there are 4 independent data streams that can be sent (or I Q) modulation, allowing for full utilization of the available EM bandwidth.

Figure 7:
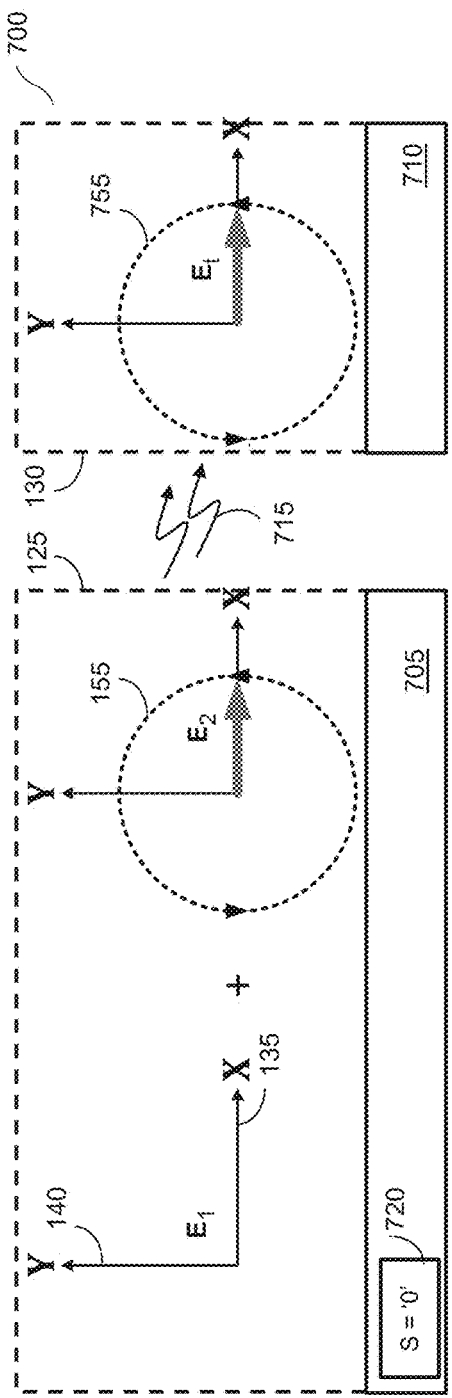
FIG. 7 is a simplified block diagram of a system for sending data from a transmitter to a receiver by polarization modulation of an electromagnetic wave with a symbol being a polarization ratio encoded to a data bit '0', in accordance with an embodiment of the present invention.

FIG. 7 is a simplified block diagram of a system 700 for sending data from a transmitter 705 to a receiver 710 by polarization modulation of an electromagnetic wave 715 with a symbol S 720 being a polarization ratio encoded to a data bit '0', in accordance with an embodiment of the present invention. FIG. 7 is similar to the embodiment shown in FIG. 1 except in FIG. 7 symbol S 720 may be encoded by setting $A_1=0$ and $A_2=1$ and by setting $\phi_1=\phi_2=0°$ in transmitter 505, which results in a polRatio($E_t$)=0. Because $A_1=0$, $E_1=0$ and its vector representation is shown accordingly. The resulting $E_t$ at the far field is a wave with CCW circular polarization 755.

Figure 8:
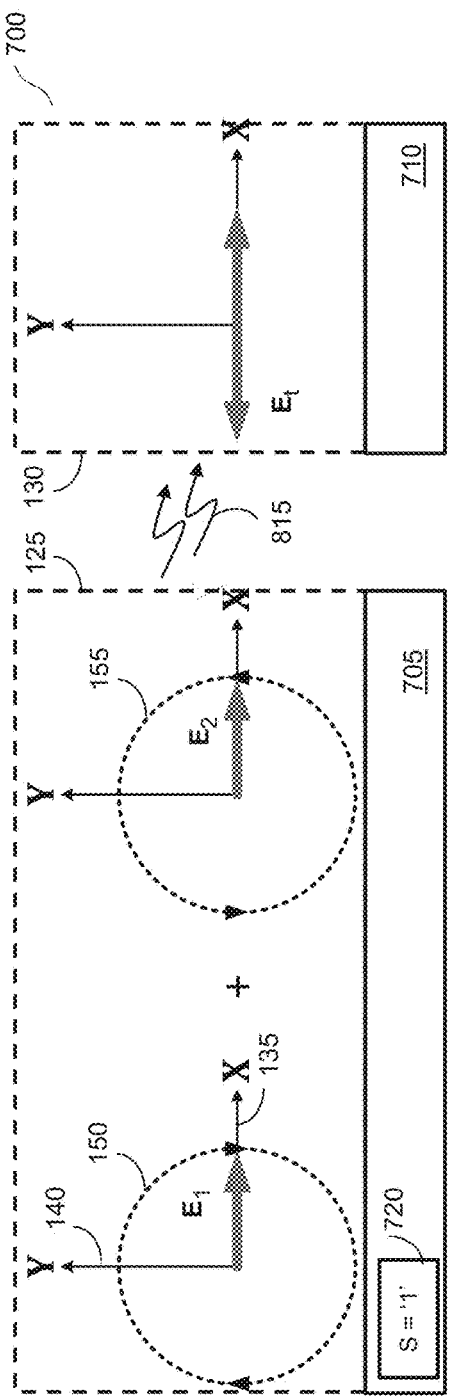
FIG. 8 is a simplified block diagram of the system for sending data shown in FIG. 7 with a symbol encoded to a data bit '0', in accordance with an embodiment of the present invention.

FIG. 8 is a simplified block diagram of system 700 for sending data shown in FIG. 7 with symbol S 720 encoded to a data bit '1', in accordance with an embodiment of the present invention. FIG. 8 is marked with the same features as FIG. 1 except symbol S 720 may be encoded by setting $A_1=A_2=1$ and by setting $\phi_1=\phi_2=0°$ in transmitter 705, which results in a polRatio($E_t$)=1. The resulting $E_t$ at the far field is a wave with linear polarization analogous to the embodiment described in reference to FIG. 1.

Figure 9:
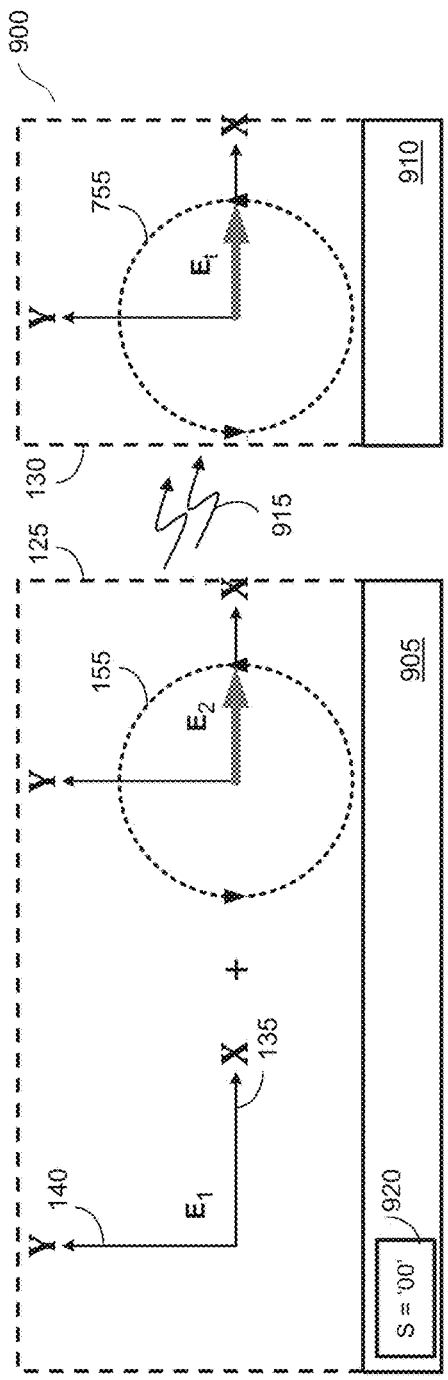
FIG. 9 is a simplified block diagram of a system for sending data from a transmitter to a receiver by polarization modulation of an electromagnetic wave with a symbol being a polarization ratio encoded to a data bit '00', in accordance with an embodiment of the present invention.

FIG. 9 is a simplified block diagram of a system 900 for sending data from a transmitter to a receiver by polarization modulation of an electromagnetic wave 915 with symbol S 920 being a polarization ratio encoded to a data bit '01', in accordance with an embodiment of the present invention. In this embodiment two bits may be transmitted simultaneously by modulating the polarization ratio. FIG. 9 is similar to the embodiment shown in FIG. 7 except in FIG. 9 symbol S 920 is encoded with two bits '00'.

Figure 10:
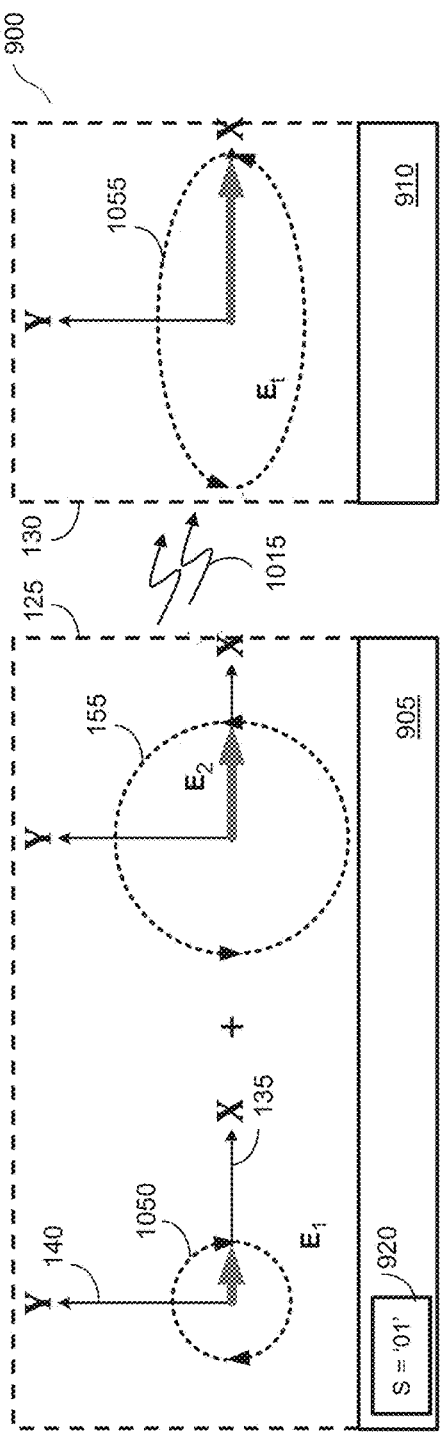
FIG. 10 is a simplified block diagram of the system for sending data shown in FIG. 9 with a symbol encoded to a data bit '01', in accordance with an embodiment of the present invention.

FIG. 10 is a simplified block diagram of system 900 for sending data shown in FIG. 9 with symbol S 920 encoded to a data bit '01', in accordance with an embodiment of the present invention. FIG. 10 is marked with the same features as FIG. 9 except symbol S 920 may be encoded by setting $A_1=½$ and $A_2=1$ and by setting $\phi_1=\phi_2=0°$ in transmitter 905, which results in a polRatio($E_t$)=½. The resulting $E_t$ at the far field is a wave with CCW elliptical polarization 1055 with major axis positioned along the X-axis.

FIG. 11 is a simplified block diagram of system 900 for sending data shown in FIG. 9 with a symbol encoded to a data bit '10', in accordance with an embodiment of the present invention. FIG. 11 is marked with the same features as FIG. 1 except symbol S 920 may be encoded by setting $A_1=A_2=1$ and by setting $\phi_1=\phi_2=0°$ in transmitter 905, which results in a polRatio($E_t$)=1. The resulting $E_t$ at the far field is a wave with linear polarization analogous to the embodiment described in reference to FIG. 1.

FIG. 12 is a simplified block diagram of the system 900 for sending data shown in FIG. 9 with symbol S 920 encoded to a data bit '11', in accordance with an embodiment of the present invention. FIG. 12 is marked with the same features as FIG. 9 except symbol S 920 may be encoded by setting $A_1=1$ and $A_2=½$ and by setting $\phi_1=\phi_2=0°$ in transmitter 905, which results in a polRatio($E_t$)=2. The resulting $E_t$ at the far field is a wave with CW elliptical polarization 1255 with major axis positioned along the X-axis.

Figure 13:
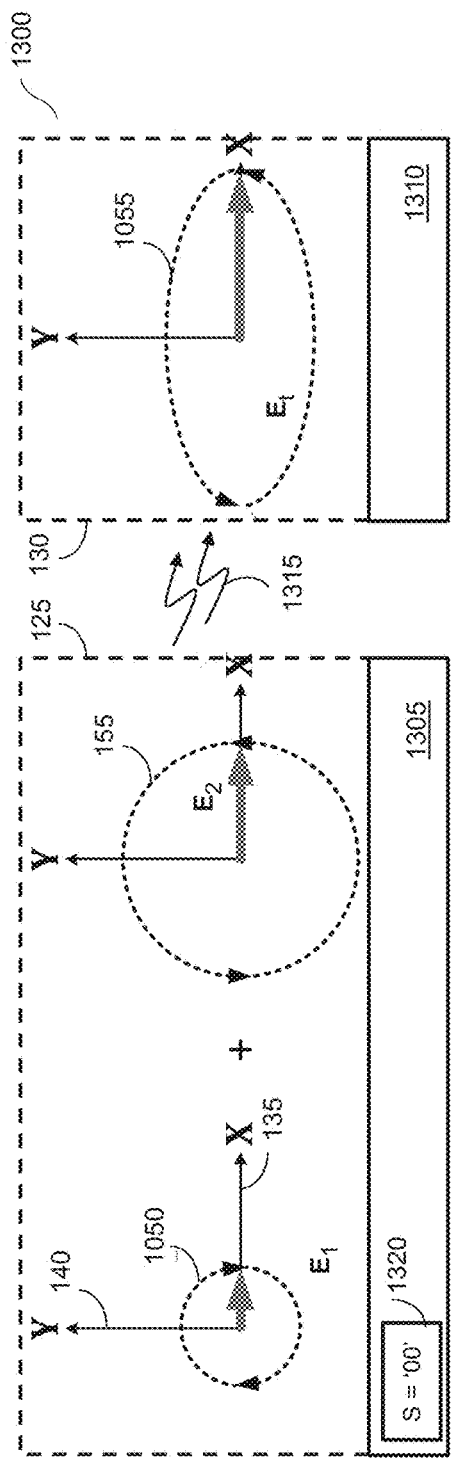
FIG. 13 is a simplified block diagram of a system for sending data from a transmitter to a receiver by polarization modulation of an electromagnetic wave with a symbol being a polarization ratio and angle encoded to a data bit '00', in accordance with an embodiment of the present invention.

FIG. 13 is a simplified block diagram of a system 1300 for sending data from a transmitter 1305 to a receiver 1310 by polarization modulation of an electromagnetic wave 1315 with a symbol S 1320 being a polarization angle and ratio encoded to a data bit '00', in accordance with an embodiment of the present invention. The polarization angle and polarization ratio are independently controlled and can be used in combination to define data encoding. FIG. 13 is marked with the same features as FIG. 10 except symbol S 1320 may be encoded for data '00'.

Figure 14:
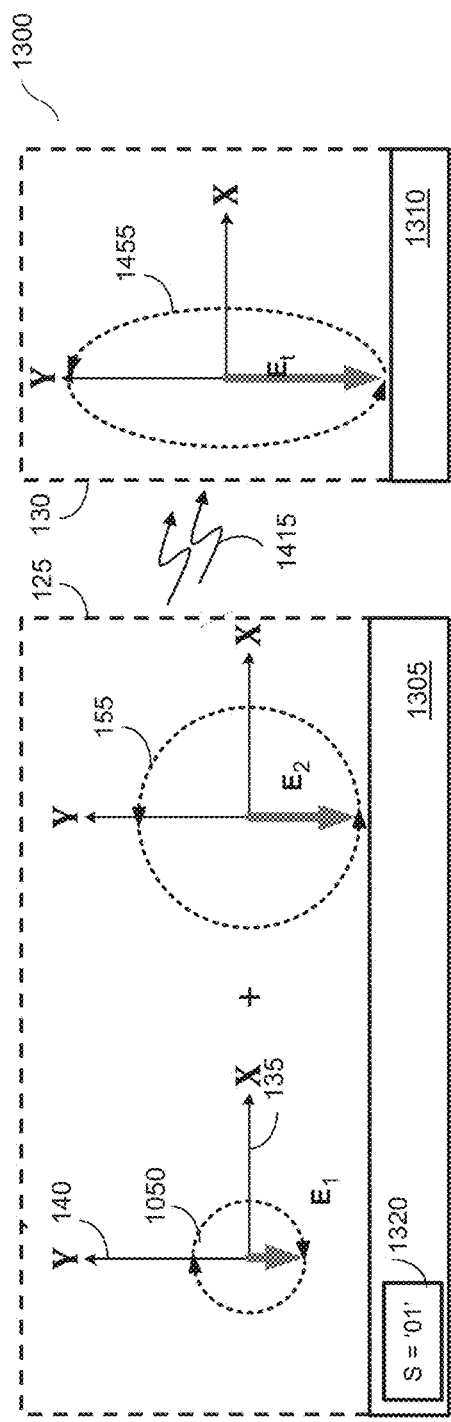
FIG. 14 is a simplified block diagram of the system for sending data shown in FIG. 13 with a symbol encoded to a data bit '01', in accordance with an embodiment of the present invention.

FIG. 14 is a simplified block diagram of system 1300 for sending data shown in FIG. 13 with symbol S 1320 encoded to a data bit '01', in accordance with an embodiment of the present invention. FIG. 14 is marked with the same features as FIG. 13 except symbol S 1320 may be encoded by setting $A_1=½$ and $A_2=1$ and by setting $\phi_1=+90°$ and $\phi_2=-90°$ in transmitter 1305, which results in a polRatio($E_t$)=½ and angle($E_t$)=−90°. The resulting $E_t$ at the far field is a wave with CCW elliptical polarization 1455 with major axis positioned along the Y-axis, i.e. angle from the X-axis=−90°.

FIG. 15 is a simplified block diagram of system 1300 for sending data shown in FIG. 13 with symbol S 1320 encoded to a data bit '10', in accordance with an embodiment of the present invention. FIG. 15 is marked with the same features as FIG. 12 except symbol S 1320 may be encoded for data '10'.

FIG. 16 is a simplified block diagram of system 1300 for sending data shown in FIG. 13 with symbol S 1320 encoded to a data bit '11', in accordance with an embodiment of the present invention. FIG. 16 is marked with the same features as FIG. 14 except symbol S 1320 may be encoded by setting $A_1=1$ and $A_2=½$ and by setting $\phi_1=+90°$ and $\phi_2=-90°$ in transmitter 1305, which results in a polRatio($E_t$)=2 and angle($E_t$)=−90°. The resulting $E_t$ at the far field is a wave with CW elliptical polarization 1655 with major axis positioned along the Y-axis, i.e. angle from the X-axis=−90°.

According to an embodiment of the present invention, a system with two linearly polarized waves that have 90° separation in polarization, i.e. the two linearly polarized waves are substantially orthogonal to each other. The analysis of these linear polarized waves is the same as above once the circularly polarized waves are broken down into Ex and Ey fields. Thus, if the waves are in phase, the far field signal will have linear polarization, and the relative amplitudes of the two waves will change the orientation of the polarization and the magnitude of the signal on it. By changing their odd mode phase, the circular polarization ratio will change, and by modulating their even mode phase will modulate the phase in the far field.

Figure 17:
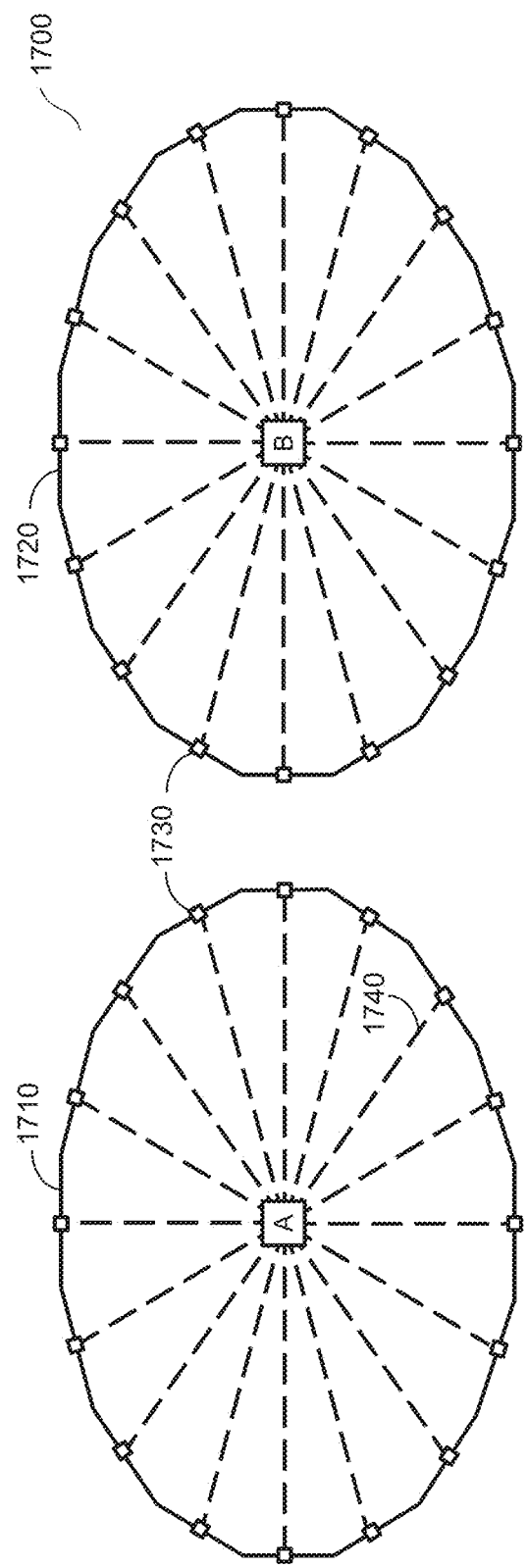
FIG. 17 is a simplified block diagram of a radiator in perspective view with a multitude of active radiators, in accordance with an embodiment of the present invention.

FIG. 17 is a simplified block diagram of a polarization modulating radiator 1700 in perspective view with a multitude of radiators, in accordance with an embodiment of the present invention, including an antenna 1710 adapted to radiate the first EM wave with CW circular polarization and second antenna 1720 adapted to radiate the second EM wave with CCW circular polarization. These individual radiators may be implemented by driving a traveling wave around a loop, such as with an active multi-drive radiator described in U.S. patent application Ser. No. 13/654,420, "EFFICIENT ACTIVE MULTI-DRIVE RADIATOR", referenced above. Each active multi-drive radiator operates by placing differential amplifier ports 1730 around are ring that are feed by input feeds from a central oscillator. The oscillator sends power at evenly spaced phases down each input feed, creating a traveling current wave around the loop and producing circularly polarized EM radiation.

The polarization direction (CW or CCW) is determined by a central oscillator A and a central oscillator B in antennas 1710 and 1720 respectively, and thus these two antennas can be implemented with opposite polarization directions. Central oscillator A and a central oscillator B can then be locked to each other, and by changing the delay in the locking mechanisms, the relative phase between antennas 1710 and 1720 can be varied and modulated. The amplitudes of the first EM wave and second EM wave with CCW can be adjusted by changing the gain of the differential amplifiers around the rings through their bias or through other means. Thus full amplitude and phase control of the two radiators is achieved, and through the process described above, modulation of the far field polarization is achieved.

Figure 18:
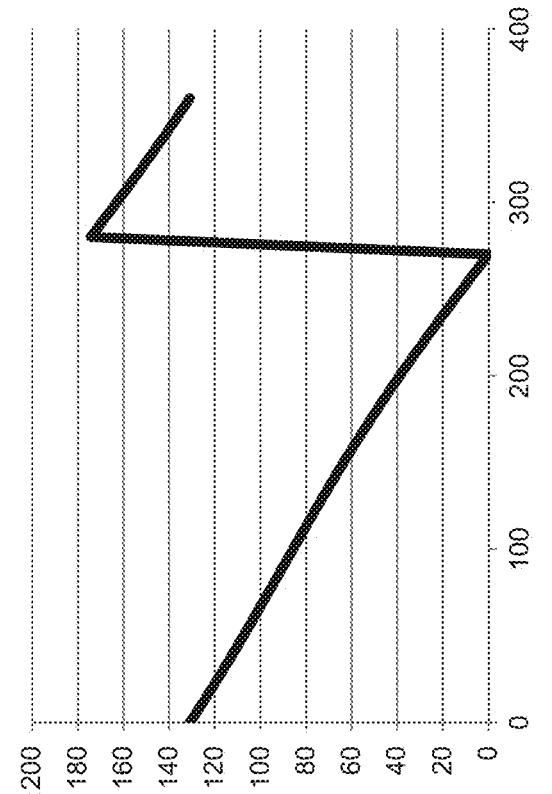
FIG. 18 is a plot of the simulation results showing the full 180° polarization angle rotation is achievable by changing the relative phase of the CW and CCW radiators shown in FIG. 17.
Figure 20:
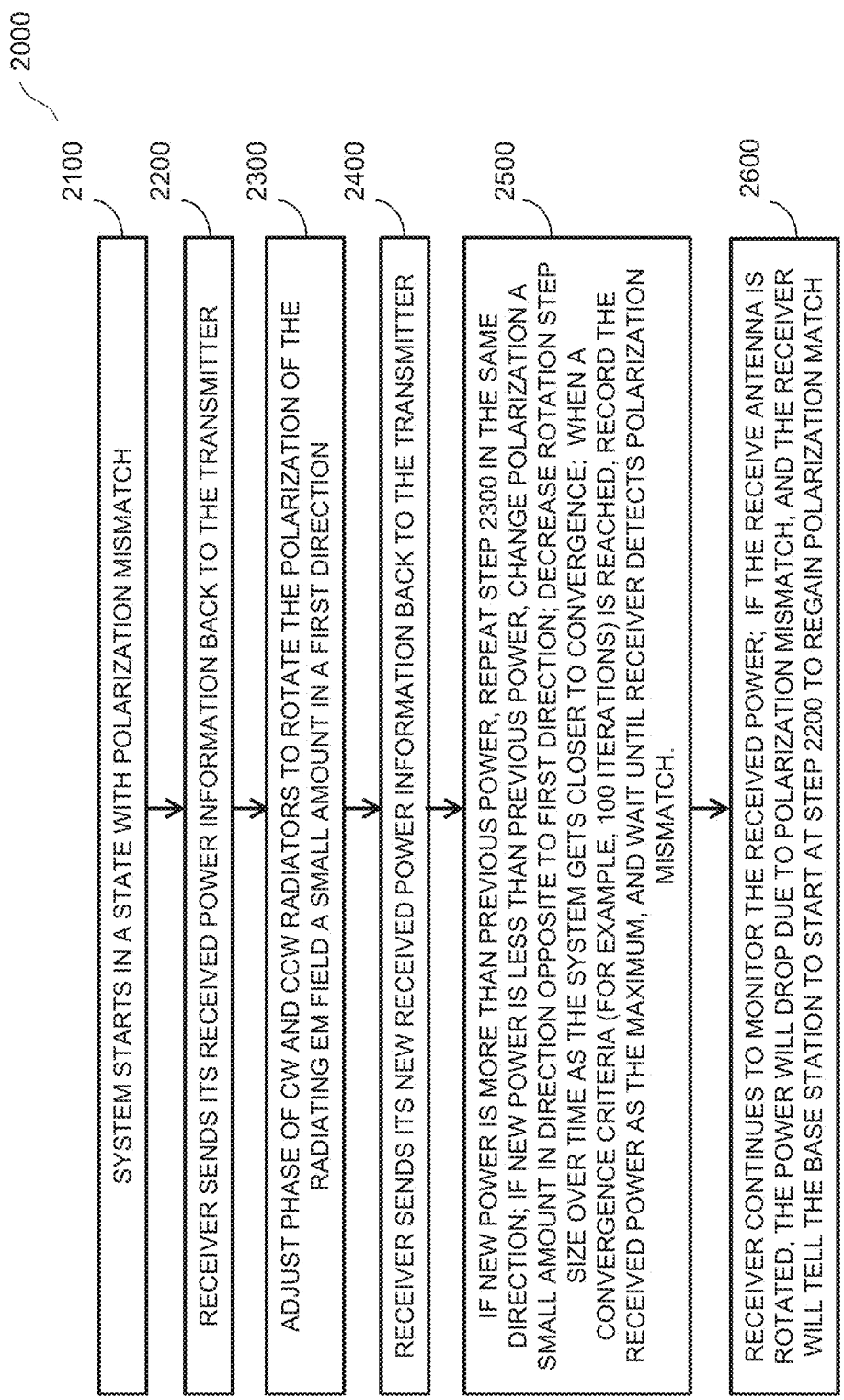
FIG. 20 is an exemplary flow chart for maintaining a polarization match between a radiator and a receiving antenna, in accordance with an embodiment of the present invention.

FIG. 18 is a plot of the simulation results showing the full 180° polarization angle rotation is achievable by changing the relative phase of the CW and CCW radiators shown in FIG. 17. FIG. 18 shows the linear polarization angle of $E_t$ on the Y-axis of the plot versus the phase offset $\Delta\phi$ between the radiators from 0 to 360 degrees on the X-axis of the plot. FIG. 18 is a plot of the simulation results showing the polarization ratio of $E_t$ versus the relative phase of the CW and CCW radiators shown in FIG. 17 when a linear polarization, i.e. polRatio($E_t$)=1, is desired. FIG. 18 shows the polarization ratio of $E_t$ on the Y-axis of the plot and the phase offset $\Delta\phi$ between the radiators from 0 to 360 degrees on the X-axis of the plot and that the polRatio($E_t$) stays in a range between about 0.9 and 1.13 as desired.

Polarization modulating radiator 1700 described above may be considered a single unit of a phased array of such radiators implemented to increase the radiated gain of the system and to allow for beam steering. A phased array of such radiators will also allow for higher overall power by utilizing power combining in the air. The angle of the beam steering will be determined by the relative phase difference between different units of radiators, in the traditional phased array way, while the relative phase between radiators in the same unit will still determine the angle of polarization.

According to one embodiment, the systems described above may be integrated together on an integrated circuit. This provides for analog and digital controlling circuitry to be implemented on chip, a radiation system capable of beam steering, as well as polarization and signal modulation in a compact integrated package.

Another embodiment of this invention is to use the system to dynamically control the polarization of signal ($E_t$). Rather than modulate the polarization, the polarization can be set to a given optimum angle and data can be transmitted in this linear polarization. If desired, due to changing environmental or other conditions, the angle of the polarization can be adjusted to maintain optimum performance in the form of power transfer to a receiver or other desired performance metric. A feedback loop with the receiver is used, a polarization angle locking scheme is used to maintain a maximum performance link between transmitter and receiver by always ensuring that the transmitted polarization angle is one that supplies the optimum performance to the system.

The goal is to stay 'polarization matched' where the polarization of the incoming wave is matched to the polarization of the receive antenna, and the receive antenna is able to receive a maximum amount of power. For this embodiment, the radiator is fixed in space, but is polarization agile, such as the previous example polarization modulating radiator 1700 with $A_1=A_2=1$ to produce a linear polarization of signal $E_t$. The receive antenna is mobile in space, and has a linearly polarized antenna. The receive antenna is also able to communicate back to the base station with information about how much power it is receiving. It should be noted that the rudimentary algorithm described below to find the maximum received power is only an example, and other 1 dimensional search algorithms to find the maximum power received may also be used.

Figure 19:
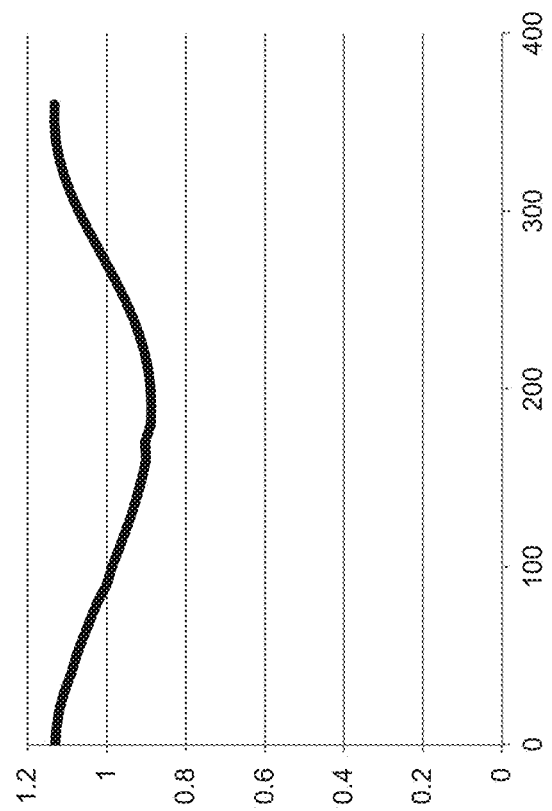
FIG. 19 is a plot of the simulation results showing the polarization ratio versus the relative phase of the CW and CCW radiators shown in FIG. 17 when a linear polarization is desired.

FIG. 19 is an exemplary flow chart 2000 for maintaining a polarization match between a radiator and a receiving antenna, in accordance with an embodiment of the present invention. Assume at step 2100 that the system, i.e. system 300 described previously, starts in a state with polarization mismatch between receiver 310 and transmitter 305. The receiver sends 2200 its received power information back to the transmitter. By only adjusting the phase of the CW and CCW radiators, the transmitter rotates 2300 the linear polarization of the $E_t$ wave a small amount, i.e. 5 degrees, in a first direction. The receiver then reports back 2400 the new received power information to the transmitter.

At step 2500, if the new power information is more than the previous power information, repeat Step 2300 in the same direction; if the new power information is less than the earlier power information, the polarization angle of the $E_t$ wave is changed a small amount in the direction opposite the first direction of change. Over time the step size of the polarization angle change can also be decreased, i.e. less than 5 degrees, as the system gets closer to convergence. When a convergence criterion, i.e. 100 loop iterations, is reached, record the received power as the maximum, and wait until receiver detects polarization mismatch. At step 2600 the transmitter continues to monitor the received power information from the receive antenna. If the receive antenna is rotated, the power will drop due to polarization mismatch, and the receiver will tell the transmitter to start back at step 2200 to regain polarization match.

Figure 21:
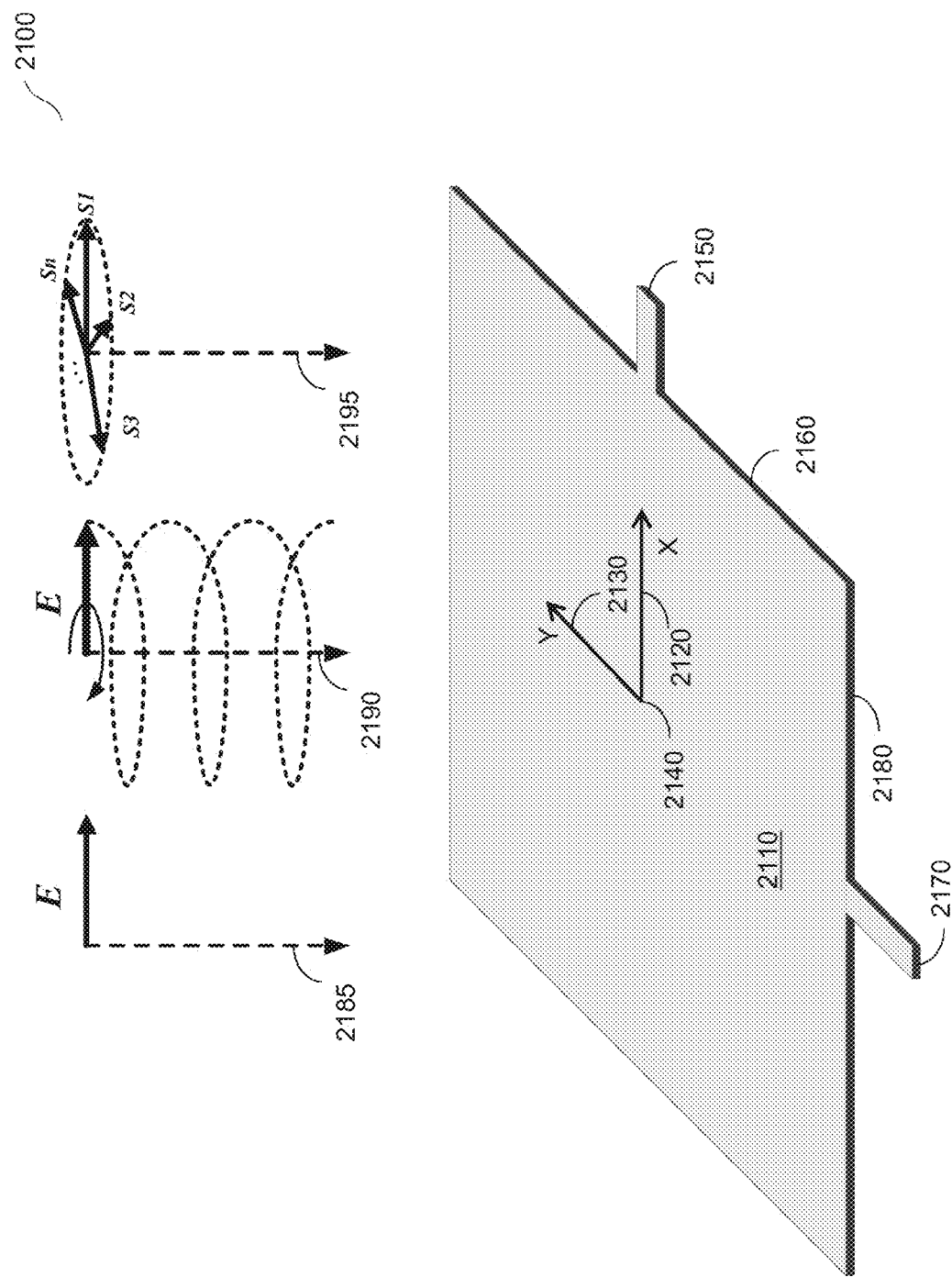
FIG. 21 is a simplified perspective view of a radiator with two orthogonal ports, in accordance with an embodiment of the present invention.

FIG. 21 is a simplified perspective view of a radiator 2100 with two orthogonal ports, in accordance with an embodiment of the present invention. Radiator 2100 includes an patch antenna 2110 positioned substantially in a plane defined by a first direction 2120 and a second direction 2130 orthogonal to the first direction, the antenna being symmetric about a center 2140 in the first direction and in the second direction, the antenna including a first port 2150 positioned at an edge 2160 of the antenna in the first direction and a second port 2170 positioned at an edge 2180 of the antenna in the second direction. Incident linear 2185, circular 2190 and polarization modulated 2195 fields are examples of fields that may be transmitted or received on radiator 2100.

Planar antennas can be integrated into IC manufacturing processes, leading to their popular use in modern wireless communication systems. In most cases such antennas are single-port antennas capable of transmitting (receiving) only a specific type of polarization. In contrast, radiator 2100 may transmit or receive simultaneously two polarizations, which are orthogonal in space, thereby any desired polarization can be resolved into these orthogonal components. This can be achieved using conventional antenna structures, i.e. a ring, patch, or slot, by adding an additional transmit (receive) port perpendicular to the existing main transmit (receive) port. It can be shown that the behavior of each individual port of such a dual-port antenna is identical to that of a single-port antenna corresponding to a given polarization. In other words, because the ports are oriented in orthogonal directions, they have no effect on each other.

Figure 22:
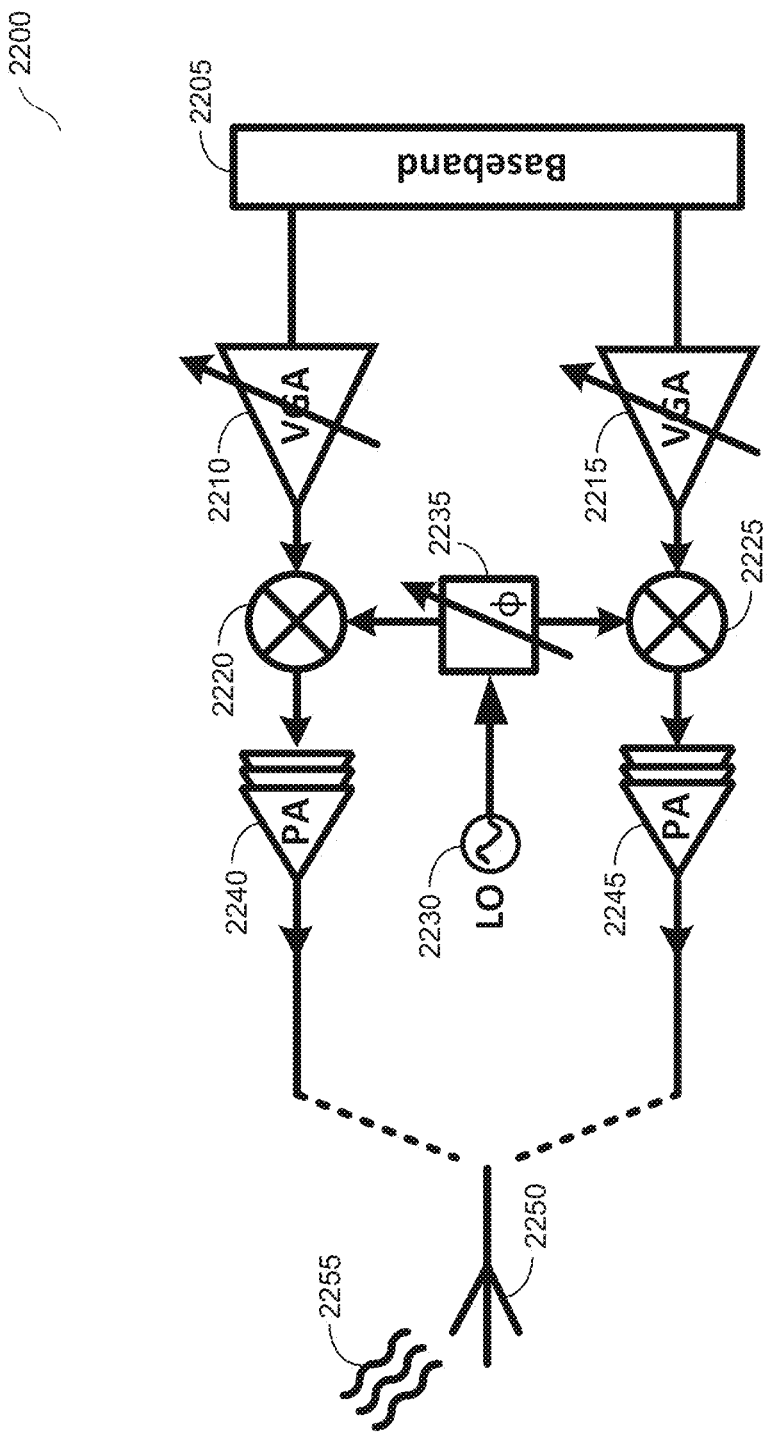
FIG. 22 is a simplified block diagram of a polarization agile transmitter circuit, in accordance with an embodiment of the present invention.

FIG. 22 is a simplified block diagram of a polarization agile transmitter circuit 2200, in accordance with an embodiment of the present invention, for sending a data from a radiator 2250 by polarization modulation of an EM wave 2255. Polarization agile transmitter circuit 2200 includes an optional baseband block 2205, an optional first variable gain amplifier (VGA) 2210 coupled to a first port of the optional baseband block 2205, and an optional second VGA 2215 coupled to a second port of the optional baseband block 2205. Polarization agile transmitter circuit 2200 further includes a first mixer or frequency converter 2220, a second mixer 2225, a local oscillator (LO) 2230, a variable phase shifter 2235, an optional first power amplifier (PA), and an optional second PA 2245.

The output of optional first VGA 2210 is input to first mixer 2220. The output of optional second VGA 2215 is input to second mixer 2225. Local oscillator 2230 is adapted to generate an oscillating signal. Variable phase shifter 2235 is coupled to LO 2235. Variable phase shifter 2235 is adapted to generate a first phase-shifted oscillating signal and a second phase-shifted oscillating signal. The first phase-shifted oscillating signal and the second phase-shifted oscillating signal have a phase difference.

Unlike common phase shift circuits which may be set to a fixed phase difference of 90°, variable phase shifter 2235 is further adapted to vary the phase difference across a predefined range in response to the data. In other words, the phase difference may be set to any phase difference in analog fashion—the predefined range set to particular phase differences as discussed in the sections above, for example, to encode data to a polarization angle used as a communication symbol of the EM wave 2255. The first mixer 2220 is coupled to variable phase shifter 2235 and is adapted to convert a frequency of the first port signal from optional baseband block 2205 in response to the first phase-shifted oscillating signal to generate a first frequency converted signal. The second mixer 2225 is coupled to variable phase shifter 2235 and is adapted to convert a frequency of the second port signal from optional baseband block 2205 in response to the second phase-shifted oscillating signal to generate a second frequency converted signal.

The first frequency converted signal is input to optional first PA 2240. The second frequency converted signal is input to optional second PA 2245. The outputs of optional first PA 2240 and optional second PA 2245 may respectively drive the first and second antenna ports 2150 and 2170 referenced in FIG. 21 or may respectively drive radiators A and B referenced in FIG. 17 above.

FIG. 22 represents one embodiment for the polarization agile transmitter showing two parallel paths. The theory of operation for radiator 1700 referenced in FIG. 17 will be discussed later, however the following discussion will use radiator 2100 referenced in FIG. 21. Depending on whether linear or circular polarization is desired, the variable phase shifter may be set respectively to 0 degree or 90 degrees. The VGAs are independently controlled at baseband and the outputs of the PAs feed the two orthogonal ports of radiator 2100. Operation of the transmitter circuit 2200 for different polarizations is discussed in the following sections.

Linear Polarization: Generic Modulation

According to one embodiment, when desired, EM wave 2255 may be a modulated signal at one particular linear polarization. The phase shifter is then set to 0 degrees, thus the two ports of radiator 2100 are driven in phase. The base-band VGAs are adjusted to generate fields in the desired polarization. This is mathematically shown as follows.

Assume the desired linear polarization is to be oriented at an angle $\theta$ with respect to one of the transmit ports of radiator 2100. The magnitude and phase are dependent upon which symbol is being transmitted. For example for constant envelope modulation schemes, $E_0$ does not vary over time, but $\phi$ varies with the symbol.

The base band signals at the input to the VGAs are as follows:

$$V_{BB,port1}=V_0 \cdot \cos[(\omega_{RF}-\omega_{LO})t] \quad \text{(Eq. 16), and}$$

$$V_{BB,port2}=V_0 \cdot \cos[(\omega_{RF}-\omega_{LO})t] \quad \text{(Eq. 17).}$$

Depending on the direction of polarization, the VGA sets weights as $\cos \theta$ & $\sin \theta$. Now the outputs of the VGAs become:

$$V_{BBVGA,port1}=V_0 \cdot \cos\theta \cdot \cos[(\omega_{RF}-\omega_{LO})t] \quad \text{(Eq. 18), and}$$

$$V_{BBVGA,port2}=V_0 \cdot \sin\theta \cdot \cos[(\omega_{RF}-\omega_{LO})t] \quad \text{(Eq. 19).}$$

Note that base-band VGA settings are held at fixed values for this case.

The up-converted signals will then be:

$$V_{port1}=V_0 \cdot \cos\theta \cdot \cos(\omega_{RF}t+\phi) \quad \text{(Eq. 20), and}$$

$$V_{port2}=V_0 \cdot \sin\theta \cdot \cos(\omega_{RF}t+\phi) \quad \text{(Eq. 21),}$$

where $\omega_{RF}$ is the RF carrier frequency (for simplicity, PA & mixer gains are kept at unity).

When these two signals are fed to the two orthogonal ports of radiator 2100, the signals combine in orthogonal directions in space, leading to an E-field vector at an angle, $$\tan^{-1}(Amp_{RF,port2}/Amp_{RF,port1})=\tan^{-1}(\sin\theta/\cos\theta)=\theta \quad \text{(Eq. 22)}$$

The E-field already has the baseband magnitude information, $$V_0=[(Amp_{RF,port1}^2+Amp_{RF,port2}^2)]^{1/2} \quad \text{(Eq. 23)}$$

And phase information in the time domain.

As discussed above, the direction of linear polarization can be varied in many useful ways. For example, if the receiver is a generic 1-port receiver, depending on its orientation, the transmitter can sweep through all possible VGA settings to find the optimum setting for maximum signal detection at the receiver. This also means that at this optimum setting, the receiver port is aligned with the incident E-field polarization. Further, the base-band VGA settings can be varied at the symbol rate to generate linear polarization modulation.

Linear Polarization: Polarization Modulation

In a polarization modulation scheme, according to one embodiment, the magnitude of the electric field vector ($E_0$), spatial orientation ($\theta$) as well as the phase ($\phi$) can all vary depending on the symbol. A linearly polarized input signal is modulated using the same dual port transmitter circuit 2200. Variable phase shifter 2235 is again kept at 0 degrees. Note that, it is impossible for a conventional single port antenna to generate symbol dependent polarization as in the present embodiment. Similar to the previous case, the derivation follows equation 16 through equation 23, however, in contrast to the previous embodiment, the VGA settings can vary with the symbol. This means that cos θ and sin θ vary with the symbol and the angle varies at the symbol rate generating polarization modulation 2195 referenced in FIG. 21.

Circular Polarization

According to one embodiment, a circular polarization can similarly be decomposed into two orthogonal components, which, contrary to the linear case, are now in quadrature. The same transmitter circuit 2200 architecture can be reused for generating circular polarization just by changing variable phase shifter 2235 to 90 degrees.

Similar to the previous cases, the derivation follows equation 16 through equation 17, however, in contrast to the previous embodiment, the VGA outputs are set at equal values for circular polarization yielding:

$$V_{BBVGA,port1}=V_0 \cdot A_{VGA} \cdot \cos [(\omega_{RF}-\omega_{LO})t] \qquad \text{(Eq. 24), and}$$

$$V_{BBVGA,port2}=V_0 \cdot A_{VGA} \cdot \sin [(\omega_{RF}-\omega_{LO})t] \qquad \text{(Eq. 25).}$$

The up-converted signals will then be:

$$V_{port1}=V_0 \cdot A_{VGA} \cdot \cos(\omega_{RF}t+\phi) \qquad \text{(Eq. 26), and}$$

$$V_{port2}=V_0 \cdot A_{VGA} \cdot \sin(\omega_{RF}t+\phi) \qquad \text{(Eq. 27),}$$

where $\omega_{RF}$ is the RF carrier frequency (for simplicity, PA & mixer gains are kept at unity). When these two signals are fed to the two orthogonal ports of the transmit antenna 2100, the signals combine in orthogonal directions in space as well as in quadrature in time, leading to a circular polarization 2190 referenced in FIG. 21.

Receiver Architecture

Figure 23:
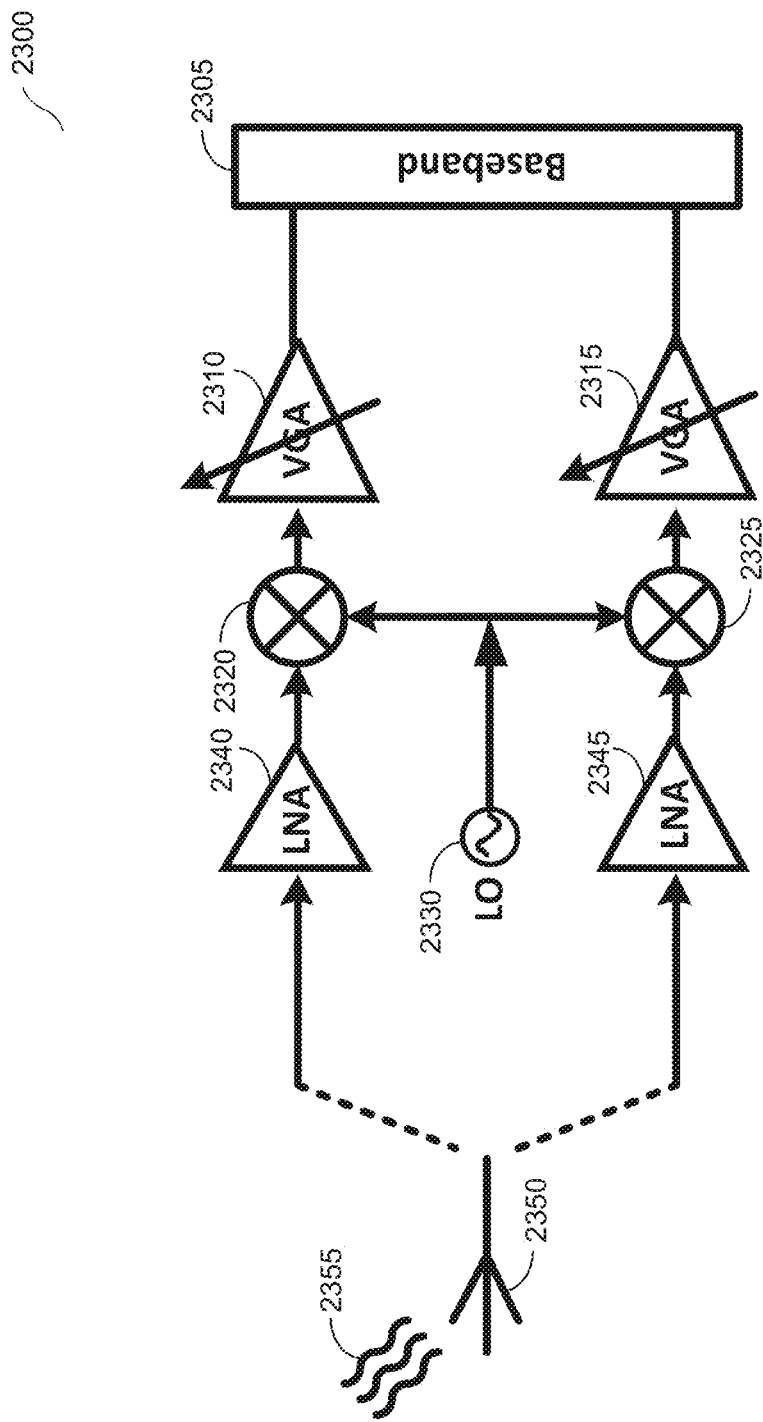
FIG. 23 is a simplified block diagram of a polarization agile receiver circuit, in accordance with an embodiment of the present invention.

FIG. 23 is a simplified block diagram of a polarization agile receiver circuit 2300, in accordance with an embodiment of the present invention, for receiving a data from a radiator 2350 by polarization modulation of an EM wave 2355. Polarization agile receiver circuit 2300 includes an optional baseband block 2305, an optional first VGA 2310 coupled to a first input port of the optional baseband block 2305, and an optional second VGA 2315 coupled to a second input port of the optional baseband block 2305. Polarization agile receiver circuit 2300 further includes a first mixer or frequency converter 2320, a second mixer 2325, a LO 2330, an optional first low noise amplifier (LNA), and an optional second LNA 2345.

Optional first VGA 2310 takes its input from the output of first mixer 2320. Optional second VGA 2315 takes its input from the output of second mixer 2325. Local oscillator 2330 is adapted to generate an oscillating signal. The first mixer 2320 is coupled to LO 2330 and is adapted to down convert a frequency of the first pick-up port signal from optional first LNA 2340 in response to the oscillating signal to generate a first frequency converted signal. The second mixer 2325 is coupled to LO 2330 and is adapted to down convert a frequency of the second pick-up port signal from optional second LNA 2345 in response to the oscillating signal to generate a second frequency converted signal.

The first frequency converted signal is input to optional first VGA 2310. The second frequency converted signal is input to optional second VGA 2315. The inputs of the optional first and second LNA may respectively pick-up the signals generated at first and second antenna ports 2150 and 2170 referenced in FIG. 21 or may respectively pick-up the signals generated at radiators A and B referenced in FIG. 17 above.

Linear Polarization: Generic Modulation

When a linear polarization at an arbitrary angle is incident upon a single port antenna, the antenna receives only a component of the incident field, which is aligned with the port of the antenna. This leads to reduced signal strength as well as orientation dependent signal.

When such a polarization is incident on the dual-port antenna 2100 referenced in FIG. 21, each port receives a part of the incident field and thus, contrary to the conventional single-port antenna, no part of the signal is lost. Also, as long as the transmitted signal is of constant magnitude, the total received signal strength is independent of the spatial orientation of the field. By detecting phase of the low-frequency down-converted signals (which are in-phase for incident linear polarization) demodulation can be performed.

Assume that the incident electric field vector has a magnitude $E_0$ and a phase $\phi$. Also assume that the field vector is oriented at an angle θ with respect to one of the receive ports of the dual-port antenna 2100. The magnitude and phase are dependent upon which symbol is being transmitted. For example for constant envelope modulation schemes, $E_0$ does not vary over time, but $\phi$ varies with the symbol.

Corresponding to an incident field of magnitude $E_0$, assume the received antenna voltage magnitude is $V_0$. Then, the voltages received at the two orthogonal ports of the dual-port antenna 2100 are:

$$V_{port1}=V_0 \cdot \cos \theta \cdot \cos(\omega_{RF}t+\phi) \qquad \text{(Eq. 28), and}$$

$$V_{port2}=V_0 \cdot \sin \theta \cdot \cos(\omega_{RF}t+\phi) \qquad \text{(Eq. 29),}$$

where $\omega_{RF}$ is the RF carrier frequency.

The down-converted (base-band) signals will then be:

$$V_{BB,port1}=V_0 \cdot \cos \theta \cdot \cos([\omega_{RF}-\omega_{LO}]t+\phi) \qquad \text{(Eq. 30), and}$$

$$V_{BB,port2}=V_0 \cdot \sin \theta \cdot \cos([\omega_{RF}-\omega_{LO}]t+\phi) \qquad \text{(Eq. 31).}$$

Note that the baseband signals are not at DC, but at a low IF frequency, where direct digital phase detection can be performed to estimate $\phi$. Also, note that for linear polarization, received signals at both ports are in-phase but with different amplitudes. Symbol detection can now be performed by looking at the magnitude and phase of the down-converted IF signal.

Linear Polarization: Polarization Modulation

In a polarization modulation scheme, the magnitude of the electric field vector ($E_0$), spatial orientation (θ) as well as the phase ($\phi$) can all vary depending on the symbol. A linear polarization modulated input signal may be demodulated using the same dual port receiver circuit 2300 architecture. Equation 28 through equation 31 again apply, however, note that unlike the previous case, $V_0$, θ, as well as $\phi$ need to be successfully estimated. Note that as before, time-delay/phase can easily be estimated by digitizing the low frequency base band outputs.

Also, both $V_0$ as well as θ are determined by the amplitudes of the received signals as follows:

$$V_0=[(Amp_{BB,port1}^2 - Amp_{BB,port2}^2)]^{1/2} \qquad \text{(Eq. 32)}$$

$$\theta=\tan^{-1}(Amp_{BB,port2}/Amp_{BB,port1}) \qquad \text{(Eq. 33)}$$

Note that for a conventional single-port receiver, two symbols—one at a different polarization angle and the other at a different magnitude will appear the same.

Circular Polarization

A circular polarization similarly may be decomposed into two orthogonal components, which, contrary to the linear case, are now in quadrature. Depending on the baseband detection scheme, it is also possible to distinguish between CCW and CW circular polarizations. The description in this section addresses linear polarization demodulating from either antenna 1700 referenced in FIG. 17 or antenna 2100 referenced in FIG. 21.

Because the two received components are in quadrature, any kind of quadrature modulation can be directly split into in-phase (I-path) and quadrature-phase (Q-path) components at the antenna 2100 itself without the need for LO phase shifters and additional techniques to minimize IQ phase imbalances.

The voltages received at the two ports can be represented as follows:

$$V_{port1} = V_0 \cdot \cos(\omega_{RF} t + \phi) \quad \text{(Eq. 34), and}$$

$$V_{port2} = V_0 \cdot \sin(\omega_{RF} t + \phi) \quad \text{(Eq. 35)},$$

where $\omega_{RF}$ is the RF carrier frequency.

For non-constant envelope modulation, $V_0$ & $\phi$ are symbol dependent, producing:

$$V_{BB,port1} = V_0 \cdot \cos([(\omega_{RF} - \omega_{LO})t + \phi]) \quad \text{(Eq. 36), and}$$

$$V_{BB,port2} = V_0 \cdot \sin([(\omega_{RF} - \omega_{LO})t + \phi]) \quad \text{(Eq. 37)}.$$

Note that, at the IF frequency, by noting which waveform is leading or lagging, the direction of polarization, i.e. CW or CCW can also be detected.

Thus, receiving circular polarization incident fields with direct in-phase (I) & quadrature-phase (Q) generation at RF through antenna 2100 is done using the dual-port antenna based receiver circuit 2300.

Figure 24:
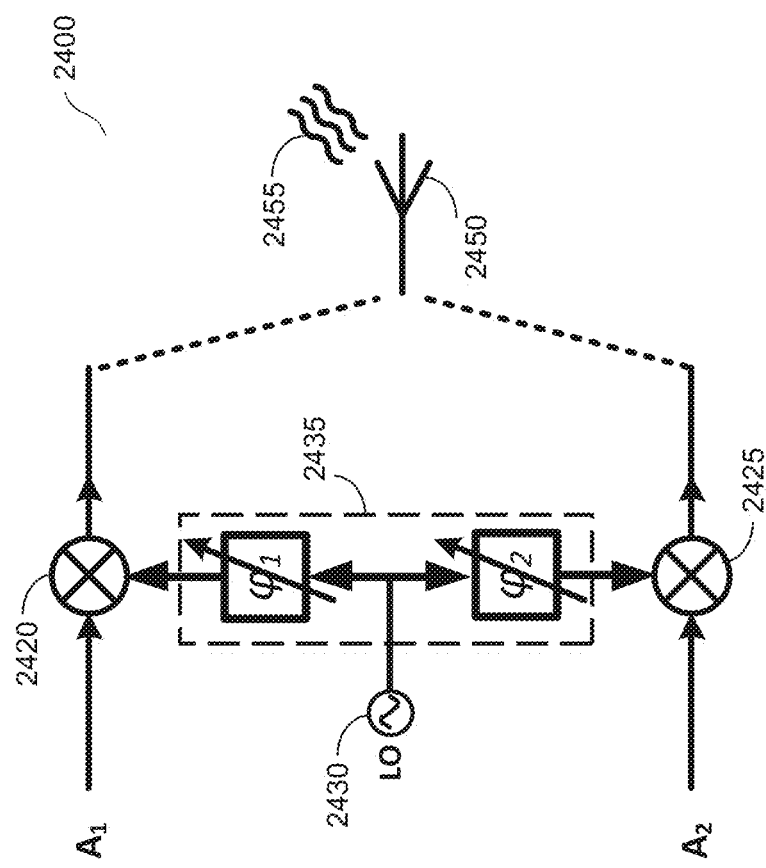
FIG. 24 is a simplified block diagram of a basic polarization agile transmitter circuit, in accordance with an embodiment of the present invention.

FIG. 24 is a simplified block diagram of a basic polarization agile transmitter circuit 2400, in accordance with an embodiment of the present invention. Compared to FIG. 22, FIG. 24 is simplified by removing the VGAs to depict $A_1$ and $A_2$. FIG. 24 shows the basic architecture, which allows control of 4 independent variables in the data stream to generate a 4-D constellation. Basic polarization agile receiver circuit 2400 includes a first mixer or frequency converter 2420, a second mixer 2425, a local oscillator (LO) 2430, a variable phase shifter 2435, and an antenna 2450 to radiate an EM wave $E_t$ 2455.

An $A_1$ signal is input to first mixer 2420. An $A_2$ signal is input to second mixer 2425. Local oscillator 2430 is adapted to generate an oscillating signal. Variable phase shifter 2435 is coupled to LO 2430. Variable phase shifter 2435 is adapted to generate a first phase-shifted oscillating signal and a second phase-shifted oscillating signal. The first phase-shifted oscillating signal and the second phase-shifted oscillating signal have a phase difference.

Unlike common phase shift circuits which may be set to a fixed phase difference of 90°, variable phase shifter 2435 is further adapted to vary the phase difference across a predefined range in response to the data. In other words, the phase difference may be set to any phase difference in analog fashion—the predefined range set to particular phase differences as discussed in the sections above, for example, to encode data to a polarization angle used as a communication symbol of the EM wave 2455. The first mixer 2420 is coupled to variable phase shifter 2435 and is adapted to convert a frequency of the $A_1$ signal in response to the first phase-shifted oscillating signal to generate a first frequency converted signal. The second mixer 2425 is coupled to variable phase shifter 2435 and is adapted to convert a frequency of the $A_1$ signal in response to the second phase-shifted oscillating signal to generate a second frequency converted signal.

The outputs of first mixer 2420 and second mixer 2420 may respectively drive the first and second antenna ports 2150 and 2170 referenced in FIG. 21 or may respectively drive radiators A and B referenced in FIG. 17 above.

As already discussed, the common mode of $\phi_1$ and $\phi_2$ provide the carrier phase and the differential mode provides information about polarization. Assuming unity VGA and PA (or LNA) gains as shown in FIG. 24, the outputs of the up-conversion mixers are now:

$$V_{port1} = A_1 \cdot \cos(\omega_0 t + \phi_1) \quad \text{(Eq. 38), and}$$

$$V_{port2} = A_2 \cdot \cos(\omega_0 t + \phi_2) \quad \text{(Eq. 39)}.$$

These two signals from equations 38 and 39 feed two ports oriented perpendicular in space, i.e. antenna 2100. Each one produces different linear polarizations in space. Now, depending on what $A_1$, $A_2$, $\phi_1$ and $\phi_2$ are, the nature of the polarization in the far-field changes.

The far-field electric field obtained by superposition is given by:

$$E_t = k \cdot A_1 \cdot \cos(\omega_0 t + \phi_1) u_x + k \cdot A_2 \cdot \cos(\omega_0 t + \phi_2) u_y \quad \text{(Eq. 40)},$$

where k encompasses antenna parameters and is assumed to be constant across the two polarizations.

Equation 40 re-written in phasor terms produces:

$$E_t = k \cdot A_1 \cdot e^{j\omega_0 t} \cdot e^{j\phi_1} \cdot u_x + k \cdot A_2 \cdot e^{j\omega_0 t} \cdot e^{j\phi_2} \cdot u_y \quad \text{(Eq. 41)}.$$

This provides the four fundamental degrees of freedom for the electric field. In the most general case, these are defined below.

The electric field in phasor notation is represented by:

$$E_t = e^{j\omega_0 t} \cdot k \cdot (A_1^2 \cdot e^{j2\phi_1} + A_2^2 \cdot e^{j2\phi_2})^{1/2} \quad \text{(Eq. 41)},$$

which contains the magnitude and time-phase of the E-field.

Polarization angle is given by:

$$\text{angle}(E_t) = \tan^{-1}(A_2/A_1) \cdot \cos(\phi_2 - \phi_1) \quad \text{(Eq. 42)}$$

Polarization ratio is given by:

$$PR = E_{CW}/E_{CCW} = (E_{CWx} + E_{CWy})/(E_{CCWx} + E_{CCWy}) \quad \text{(Eq. 43)},$$

where the circular polarization terms can be obtained by resolving the linear polarizations $E_x$ & $E_y$ into their respective polarization components.

The following examples summarize the various polarization modulation embodiments.

Linear polarization is provided when $\phi_1 = \phi_2$.

Linear polarization modulation is provided when $\phi_1 = \phi_2$, but $A_1$ and $A_2$ are data dependent.

Circular polarization is provided when $\phi_1$ and $\phi_2$ are 90° apart, and $A_1 = A_2$ Elliptical polarization is provided when $\phi_1$ and $\phi_2$ are an arbitrary angle apart, and $A_1$ and $A_2$ are unequal.

The above embodiments of the present invention are illustrative and not limiting. Various alternatives and equivalents are possible. Although, the invention has been described with reference to certain antennas by way of an example, it is understood that the invention is not limited by the antenna technology. Other additions, subtractions, or modifications are obvious in view of the present disclosure and are intended to fall within the scope of the appended claims.

What is claimed is:

1. A method for sending a data from an electromagnetic radiator by polarization modulation of an electromagnetic wave, the method comprising:
   radiating from the radiator through space a first electromagnetic wave including a first polarization;
   radiating from the radiator through space a second electromagnetic wave including a second polarization different than the first polarization, the first and second electromagnetic waves forming a third electromagnetic wave having a third polarization different from the first or second polarization;
   changing a difference between the first and second polarization via a variable phase shifter adapted to vary relative phases over a predefined range; and
   modulating the third polarization in response to the data.

2. The method of claim 1, wherein the first electromagnetic wave includes a first amplitude and the second electromagnetic wave includes a second amplitude, wherein third polarization is defined by the first and second amplitudes.

3. The method of claim 1, wherein the first electromagnetic wave includes a first phase and a first amplitude and the second electromagnetic wave includes a second phase and a second amplitude, wherein modulating one or more parts includes simultaneously modulating the first phase, the second phase, the first amplitude, and the second amplitude.

4. The method of claim 1 further comprising:
   setting the first polarization to a first linear polarization having a first angle; and
   setting the second polarization to a second linear polarization having a second angle substantially perpendicular to the first angle.

5. The method of claim 1, wherein the third polarization is a linear polarization.

6. The method of claim 1, wherein the third polarization is an elliptical polarization.

7. A method for sending a data from an electromagnetic radiator by polarization modulation of an electromagnetic wave, the method comprising:
   radiating from the radiator through space a first electromagnetic wave including a first polarization;
   radiating from the radiator through space a second electromagnetic wave including a second polarization different than the first polarization, the first and second electromagnetic waves forming a third electromagnetic wave having a third polarization different from the first or second polarization;
   modulating the third polarization in response to the data by modulating one or more parts of the third electromagnetic wave, wherein the data is sent in the third polarization;
   setting the first polarization to a clock-wise circular polarization; and
   setting the second polarization to a counter-clock-wise circular polarization.

8. A method for sending a data from an electromagnetic radiator by polarization modulation of an electromagnetic wave, the method comprising:
   radiating from the radiator through space a first electromagnetic wave including a first polarization;
   radiating from the radiator through space a second electromagnetic wave including a second polarization different than the first polarization, the first and second electromagnetic waves forming a third electromagnetic wave having a third polarization different from the first or second polarization;
   modulating the third polarization in response to the data by modulating one or more parts of the third electromagnetic wave, wherein the data is sent in the third polarization;
   setting a first amplitude of the first electromagnetic wave equal to a second amplitude of the second electromagnetic wave;
   setting the first polarization to a clock-wise circular polarization;
   setting the second polarization to a counter-clock-wise circular polarization, wherein the one or more parts includes a first phase of the first electromagnetic wave and a second phase of the second electromagnetic wave, the third polarization being a linear polarization having an angle; and
   modulating the angle responsive to a difference between the first and second phase, the difference being responsive to the data.

9. The method of claim 8, wherein the angle corresponds to a symbol representing the data.

10. The method of claim 8, wherein the symbol sends a single bit of information at a time.

11. The method of claim 8, wherein the symbol sends a plurality of bits of data simultaneously in time.

12. A method for sending a data from an electromagnetic radiator by polarization modulation of an electromagnetic wave, the method comprising:
   radiating from the radiator through space a first electromagnetic wave including a first polarization;
   radiating from the radiator through space a second electromagnetic wave including a second polarization different than the first polarization, the first and second electromagnetic waves forming a third electromagnetic wave having a third polarization different from the first or second polarization;
   modulating the third polarization in response to the data by modulating one or more parts of the third electromagnetic wave, wherein the data is sent in the third polarization:
   setting a first phase of the first electromagnetic wave equal to a second phase of the second electromagnetic wave;
   setting the first polarization to a clock-wise circular polarization;
   setting the second polarization to a counter-clock-wise circular polarization, wherein the one or more parts includes a first amplitude of the first electromagnetic wave and a second amplitude of the second electromagnetic wave, the third polarization being an elliptical polarization having a polarization ratio; and
   modulating the polarization ratio responsive to the data.

13. The method of claim 12, wherein the polarization ratio is a quotient of the first amplitude divided by the second amplitude.

14. The method of claim 12, wherein the polarization ratio corresponds to a symbol representing the data.

15. The method of claim 14, wherein the symbol sends a single bit of information at a time.

16. The method of claim 14, wherein the symbol sends a plurality of bits of data simultaneously in time.

* * * * *